(12) United States Patent
Hiraguchi

(10) Patent No.: US 7,021,578 B2
(45) Date of Patent: Apr. 4, 2006

(54) RECORDING TAPE CARTRIDGE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/735,773

(22) Filed: Dec. 16, 2003

(65) Prior Publication Data

US 2004/0124302 A1    Jul. 1, 2004

(30) Foreign Application Priority Data

Dec. 18, 2002    (JP) .............................. 2002-366602

(51) Int. Cl.
*G11B 23/107*    (2006.01)
(52) U.S. Cl. ..................... 242/338.1; 242/348; 360/132
(58) Field of Classification Search ................ 242/343, 242/343.1, 343.2, 338, 338.1, 338.2, 348, 242/348.1, 348.3, 611, 611.1; 360/132
See application file for complete search history.

(56) References Cited

U.S. PATENT DOCUMENTS

| 5,901,916 | A | 5/1999 | McAllister et al. |
| 6,264,126 | B1 * | 7/2001 | Shima et al. ................ 242/343 |
| 6,273,352 | B1 * | 8/2001 | Johnson et al. ............. 360/132 |
| 6,411,466 | B1 * | 6/2002 | Shima et al. ................ 360/132 |
| 6,452,748 | B1 | 9/2002 | Shima et al. |
| 6,499,686 | B1 * | 12/2002 | Tsuyuki et al. ............. 242/348 |
| 6,563,671 | B1 * | 5/2003 | Morita et al. ................ 360/132 |
| 6,568,619 | B1 * | 5/2003 | Shiga et al. ................. 242/348 |
| 6,667,852 | B1 * | 12/2003 | Morita et al. ............... 360/132 |

FOREIGN PATENT DOCUMENTS

| JP | 63-251983 A | 10/1988 |
| JP | 2000-331454 A | 11/2000 |
| JP | 3187022 B2 | 5/2001 |
| JP | 2002-197833 A | 7/2002 |

* cited by examiner

*Primary Examiner*—William A. Rivera
(74) *Attorney, Agent, or Firm*—Sughrue Mion, PLLC

(57) ABSTRACT

A recording tape cartridge in which melting, abrasion or the like does not occur at a portion of abutting of a brake member with a release member, or with a release portion of a drive device, during rotation of a reel. In this recording tape cartridge, a magnetic tape is wound onto the reel at a reel hub inside a case. A brake member is non-rotatably provided inside the case. The reel is rotation-locked when the brake member is disposed at a rotation-locking position, at which the brake member engages with an engaging protrusion of a bottom portion. A release pad is disposed between the bottom portion and the brake member and abuts against both thereof. When the release pad holds the brake member at a rotation-enabling position, the reel is rotatable. When the reel rotates with the release pad, a metal-formed rubbing protrusion portion of the brake member, which is a convex spherical surface with a radius of at least 3 mm, and a resin-formed rubbing protrusion of the release pad, which is a flat surface, rub against one another.

25 Claims, 14 Drawing Sheets

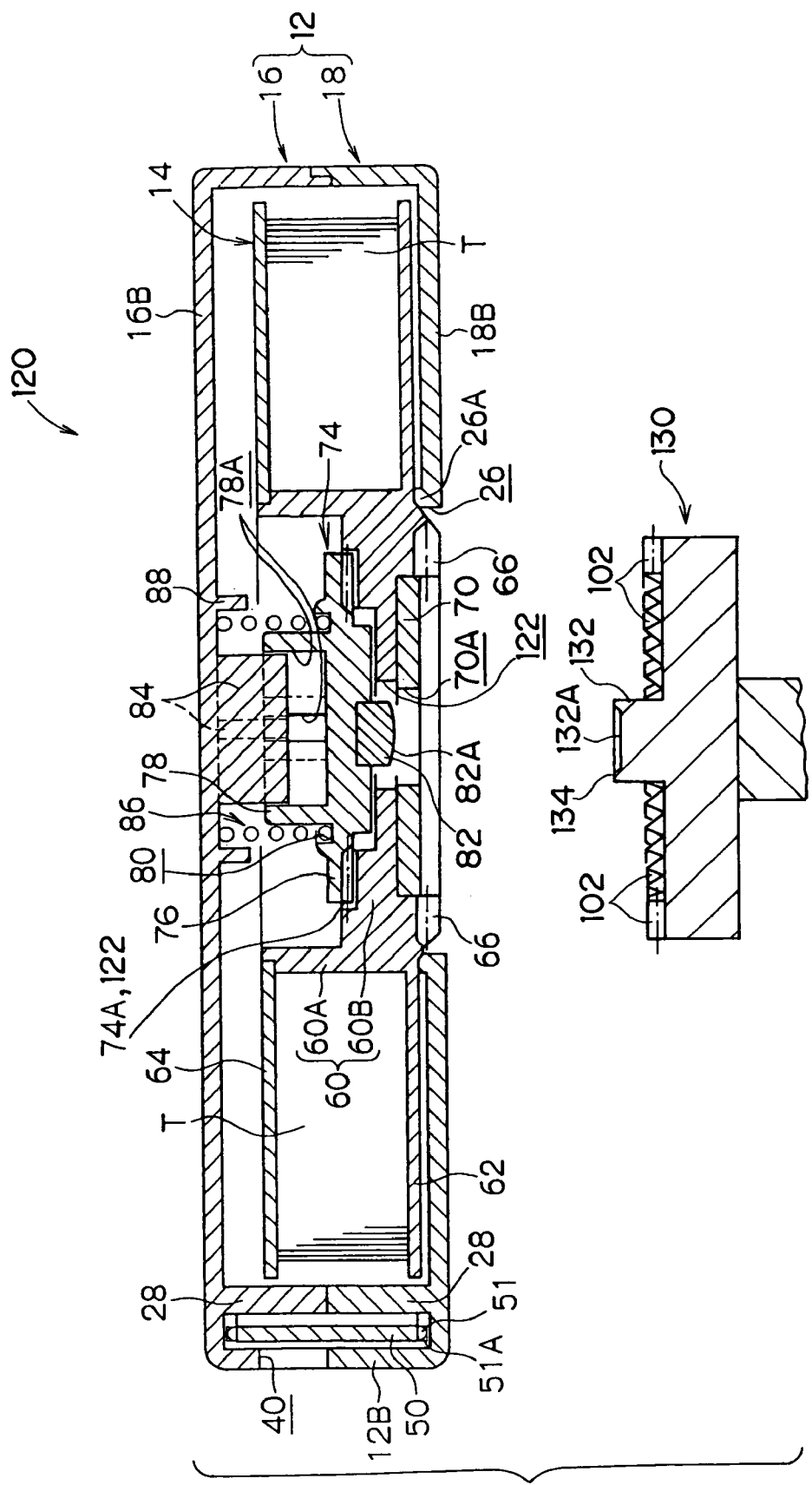

RECORDING TAPE CARTRIDGE

CROSS-REFERENCE TO RELATED APPLICATION

This application claims priority under 35USC 119 from Japanese Patent Application No. 2002-366602, the disclosure of which is incorporated by reference herein.

BACKGROUND OF THE INVENTION

1. Field of the Invention

The present invention relates to a recording tape cartridge which rotatably accommodates a reel onto which recording tape, such as a magnetic tape or the like, is wound.

2. Description of the Related Art

Recording tapes such as magnetic tapes and the like are used as external recording media for computers and the like. "One-reel" recording tape cartridges, which rotatably accommodate a single reel onto which a recording tape is wound, take up little space when stored and can record large amounts of information, and are employed as such recording tapes.

Such a recording tape cartridge is equipped with a brake structure such that the reel does not rotate inside the case at times of non-use (see, for example, the specification of Japanese Patent No. 3,187,022). A recording tape cartridge equipped with this brake structure is now described with reference to FIGS. 13 and 14.

In a recording tape cartridge 200 shown in FIG. 13, a single reel 204 is accommodated in a case 202. The case 202 is provided with a gear aperture 206 and a rotation-limiting rib 208. The gear aperture 206 is formed at a central portion of a floor plate 202A of the case 202. The rotation-limiting rib 208 protrudes downward from a ceiling plate 202B of the case 202.

The reel 204 is provided with a reel hub 210, which is formed in a circular tube shape with a base, around an outer peripheral portion of which recording tape is wound. At a lower face of a base portion 210A of the reel hub 210, a reel gear 214 is formed in an annular shape. The reel gear 214 is meshable with a driving gear 212A, which is formed at a rotation shaft 212 of a drive device. Insertion through-holes 216, which penetrate through the base portion 210A, are provided at a plurality of locations on a circular periphery, at the portion at which the reel gear 214 is formed. The insertion through-holes 216 are equidistant. A diameter of each insertion through-holes 216 is set to be larger than a gear pitch of the reel gear 214, and teeth of the reel gear 214 are not provided in a vicinity of each insertion through-hole 216.

At an upper face of the base portion 210A of the reel hub 210, engaging protrusions 218 are provided standing from (portions of) a plurality of locations along the predetermined circular periphery, between the insertion through-holes 216. Gear teeth 218A are formed at upper end portions of the engaging protrusions 218.

A disc-like brake member 220 is insertedly provided inside the reel hub 210. At a lower face of the brake member 220, an annular brake gear 220A is provided. The brake gear 220A is capable of meshing with the gear teeth 218A. A projection 222 is provided standing from an upper face of the brake member 220. The projection 222 is provided with an insertion groove 222A, into which the rotation-limiting rib 208 of the case 202 is inserted. When the rotation-limiting rib 208 enters this insertion groove 222A, the brake member 220 is rendered incapable of rotating relative to the case 202. Moreover, the brake member 220 is rendered movable only in a vertical direction, being guided by the rotation-limiting rib 208.

A compression coil spring 224 is disposed between the ceiling plate 202B of the case 202 and the brake member 220. Usually, the brake member 220 is urged downward by urging force of the compression coil spring 224, whereby the brake gear 220A is meshed with the gear teeth 218A. Thus, the brake member 220 is ordinarily in a rotation-locked state in which rotation of the reel 204 relative to the case 202 is blocked. Moreover, the reel 204 is pressed against the floor plate 202A of the case 202 by this urging force, and the reel gear 214 is exposed through the gear aperture 206.

Further, a release member 226 is disposed between the base portion 210A of the reel hub 210 and the brake member 220, so as to abut against the base portion 210A and the brake member 220. The release member 226 is formed in a plate form which does not interfere with the engaging protrusions 218, and is provided with leg portions 226A, which are respectively inserted into the insertion through-holes 216.

Thus, when the driving gear 212A is operated to mesh with the reel gear 214, as shown in FIG. 14, the leg portions 226A are pushed by the driving gear 212A, against the urging force of the compression coil spring 224, and the release member 226 is pushed upward. The release member 226 moves away from the base portion 210A and pushes the brake member 220 upward. Thus, meshing between the brake gear 220A and the gear teeth 218A is released. At this time, the reel 204 also rises relative to the floor plate 202A, and the reel 204 becomes rotatable inside the case 202.

The release member 226 has structure such that, in a state in which meshing of the driving gear 212A with the reel gear 214 is maintained, the leg portions 226A of the release member 226 are in contact with the driving gear 212A, and thus the release member 226 holds the brake member 220 at the release position described above.

Hence, the reel 204, whose reel gear 214 meshes with the driving gear 212A of the rotation shaft 212 when the rotation shaft 212 rotates, is a structure which rotates in the case 202. At this time, the release member 226 whose leg portions 226A are inserted into the insertion through-holes 216 of the reel 204 rotates integrally with the reel 204, and an axial center portion of the reel 204 rubs against (i.e., slidingly contacts) an axial center portion of the brake member 220.

Then, when the state of meshing of the driving gear 212A with the reel gear 214 is released, the brake member 220 is moved downward by the urging force of the compression coil spring 224, the brake gear 220A meshes with the gear teeth 218A, and the reel 204 is pushed against the floor plate 202A. As a result, the structure returns to the rotation-locked state in which rotation of the reel 204 relative to the case 202 is blocked.

The brake member 220 and release member 226 described above are both formed by resin-molding, such that complex forms can be produced with ease. In order to reduce rubbing resistance between the brake member 220 and the release member 226 when the reel 204 rotates, a portion of the brake member 220 that abuts (rubs) against the release member 226, which is an axial center portion of the brake member 220, is formed with a protrusion portion 220B, which is formed substantially in a spherical surface form. Thus, the brake member 220 is substantially in point contact with the axial center portion of the release member 226. Conversely, a portion of the release member 226 that abuts against the protrusion portion 220B of the brake member 220 is formed as a protrusion portion 226B, whose upper end is a flat surface. Thus, this structure has low susceptibility to occurrences of off-centering of the relatively rotating brake member 220 and release member 226.

Further, in order to effect a function of alignment between the brake member 220 and the release member 226, in addition to preventing this off-centering, a structure is known in which one of these abutting portions is formed as a convex surface and the other is structured as a concave surface with a greater diameter than the convex surface (see, for example, Japanese Patent Application (JP-A) No. 2000-331454).

Anyway, in recent years, increases in recording density of the recording tape cartridge have been demanded. In response to these demands, for example, reducing thickness of the recording tape and lengthening an amount of the recording tape that is wound onto the reel has been considered. Further, in accordance with increases in speeds of writing information onto the recording tape and reading information that has been recorded onto the recording tape, increasing a drawing-out speed (feeding speed) of the recording tape has been considered. Accordingly, for the recording tape cartridge 200, measures to deal with a lengthening of a continuous rotation time of the reel 204 and an increase in rotation speed of the reel 204 have been demanded.

However, at the recording tape cartridge 200, during rotation of the reel 204, the protrusion portion 220B of the brake member 220 and the protrusion portion 226B of the release member 226, which are respectively resin members, rub against one another. Therefore, if the rotation speed of the reel 204 becomes greater (for example, a feeding speed of the recording tape of 6 m/s or more) and the duration of the rotation becomes longer, heat is generated by rubbing resistance, and thus there is a problem in that the protrusion portion 220B and the protrusion portion 226B will melt. This problem similarly arises in the structure of JP-A No. 2000-331454.

Further, although this is not shown in the drawings, a structure is also known in which the release member 226 is not provided (for example, JP-A No. 63-251983). The protrusion portion 220B of the brake member 220 is directly pushed by a release portion. The release portion is protrudingly provided at an axial center portion of the rotation shaft 212 and advances in through a through-hole which penetrates through the base portion 210A of the reel hub 210. Thus, the brake member 220 is pushed up, and the rotation-locked state of the reel 204 is released. In this structure too, the protrusion portion 220B and the drive device side release portion rub against one another during rotation of the reel 204, and are formed of resin materials. Therefore, under the usage conditions described above, there is a risk that the protrusion portion 220B or the release portion may begin to melt. Note that, similarly to the protrusion portion 226B, a surface of the release portion of the drive device that rubs against the protrusion portion 220B is a flat surface.

Accordingly, in order to suppress this generation of heat, a structure (for example, JP-A No. 2002-197833) has been considered in which a portion corresponding to the protrusion portion 226B of the release member 226 is structured of a metallic material. Thus, rubbing resistance between the metallic material and the protrusion portion 220B, which is a resin material, is reduced. In this structure, the generation of heat in accordance with rubbing resistance between the protrusion portion 220B and the protrusion portion 226B is suppressed, and melting of the resin material protrusion portion 220B is prevented.

However, in the structure disclosed in JP-A No. 2002-197833, under conditions in which the rotation speed of the reel 204 has been increased and the rotation duration has been lengthened as described earlier, there is a problem in that the spherical surface-form protrusion portion 220B, which is the resin side, is abraded or worn down (crushed), and height thereof becomes lower. JP-A No. 2002-197833 further discloses a structure in which a metallic sphere is fitted in at the brake member 220 to form the surface abutting against the release member 226. However, for such a case, diameter of the metallic sphere, the form of the abutting surface of the release member 226 which is the opposite member, and the like are not described at all. That is, in the structures of JP-A No. 2002-197833, melting, abrasion or the like does not occur at the resin side abutting portion under predetermined conditions (i.e., conditions such that a magnetic tape which has been drawn out 10 metres from the case is wound back onto the reel in the case by an operation of 25,000 revolutions), but abrasion or wearing of the resin side abutting portion under conditions in which the rotation speed of the reel 204 has been increased and the rotation duration has been lengthened, corresponding to conditions of use which are expected hereafter, has not been considered at all, and such abrasion or the like cannot be prevented.

Thus, if melting of the protrusion portion 220B and the protrusion portion 226B or abrasion of the protrusion portion 220B or the like occurs as described above, the brake member 220, which is urged by the compression coil spring 224, moves downward and an amount of insertion of the rotation-limiting rib 208 into the insertion groove 222A of the brake member 220 is reduced. At the projection 222 and the rotation-limiting rib 208 of the case 202, which are channel walls of the insertion groove 222A, draft angling is provided for die release at a time of resin-molding. Therefore, when the above-mentioned insertion amount decreases, a gap between an inner face of the projection 222 and the rotation-limiting rib 208 becomes larger, and this is a cause of looseness of the brake member 220 and the generation of noise during rotation of the reel 204. Further, in the recording tape cartridge 200 in which the protrusion portion 220B abuts against the protrusion portion 226B (i.e., a structure of Japanese Patent No. 3,187,022, JP-A No. 2000-331454 or JP-A No. 2002-197833), a reduction in the insertion amount causes looseness of the brake member 220 at times of non-use.

SUMMARY OF THE INVENTION

In light of the circumstances described above, an object of the present invention is to provide a recording tape cartridge in which melting, abrasion or the like does not occur at a portion of a release member, or of a release portion of a drive device, which portion abuts against a brake member during rotation of a reel.

In order to achieve the object described above, according to a first aspect of the present invention, a tape cartridge which is insertable at a tape drive which includes a rotating member and carries out at least one of reading and writing of data is provided, which tape cartridge includes: a reel inside the tape cartridge, the rotating member of the tape drive being engageable with the reel at a time of insertion of the tape cartridge, for transmitting rotary driving force to the reel; a brake member which is reciprocally movable between a locking position for prohibiting rotation of the reel and an unlocking position for enabling rotation of the reel; and a release pad which is capable of engaging with the rotating member and abutting against the brake member for the reciprocal movement of the brake member. One of mutually abutting portions of the brake member and the release pad includes a metallic surface which includes one of a flat surface form and a spherical form with a spherical radius of at least 3 mm, and the other of the mutually abutting portions includes a resin surface which includes one of a flat surface form and a curvedly recessed surface form.

According to another aspect of the present invention, a tape cartridge which is insertable at a tape drive which includes a rotating member and carries out at least one of reading and writing of data is provided, which tape cartridge includes: a reel inside the tape cartridge, the rotating member of the tape drive being engageable with the reel at a time of insertion of the tape cartridge, for transmitting rotary driving force to the reel; a brake member which is reciprocally movable between a locking position for prohibiting rotation of the reel and an unlocking position for enabling rotation of the reel; and an abutting portion provided at the brake member, the abutting portion being fabricated of metal and including an abutting surface which is capable of abutting against the rotating member for the reciprocal movement of the brake member at the time of insertion of the tape cartridge.

BRIEF DESCRIPTION OF THE DRAWINGS

FIG. 11 is a sectional view showing a rotation-locked state of a reel of a recording tape cartridge relating to a second embodiment of the present invention.

DETAILED DESCRIPTION OF THE INVENTION

A recording tape cartridge 10 relating to a first embodiment of the present invention will be explained on the basis of FIGS. 1 to 9. Firstly, general overall structure of the recording tape cartridge 10, and structure of an opening and a door, will be explained. Then, a reel 14 and a brake structure which prevents rotation of the reel 14 at times of non-use, which are principal elements of the present invention, will be explained. For the sake of convenience of explanation, a loading direction of the recording tape cartridge 10 into a drive device, which is shown by arrow A, is referred to as a forward direction (a front side) of the recording tape cartridge 10, and the direction of an arrow B, which intersects arrow A, is a rightward direction.

Overall Structure of Recording Tape Cartridge

Figure 1:
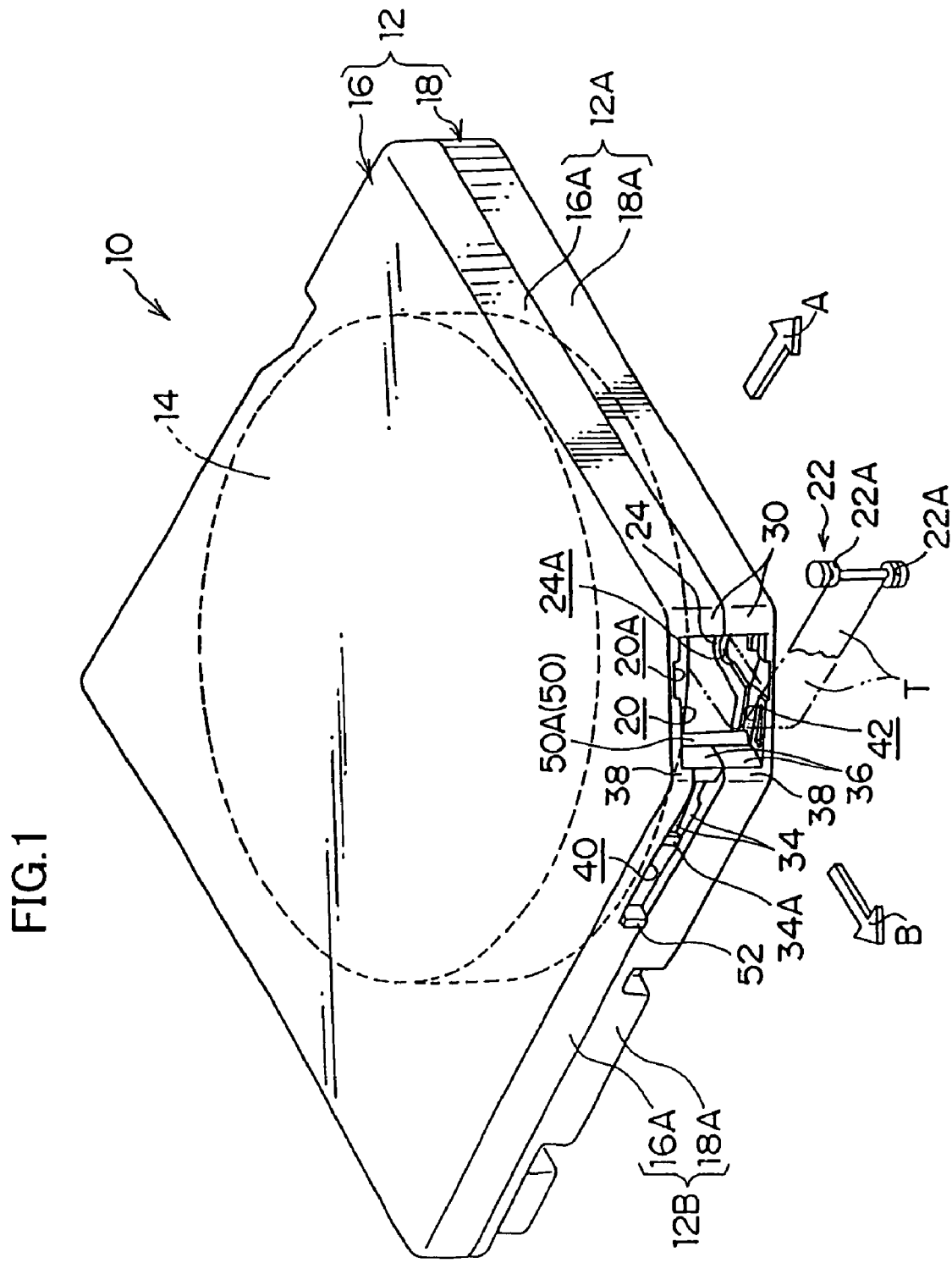
FIG. 1 is a perspective view showing overall structure of a recording tape cartridge relating to a first embodiment of the present invention.
Figure 2:
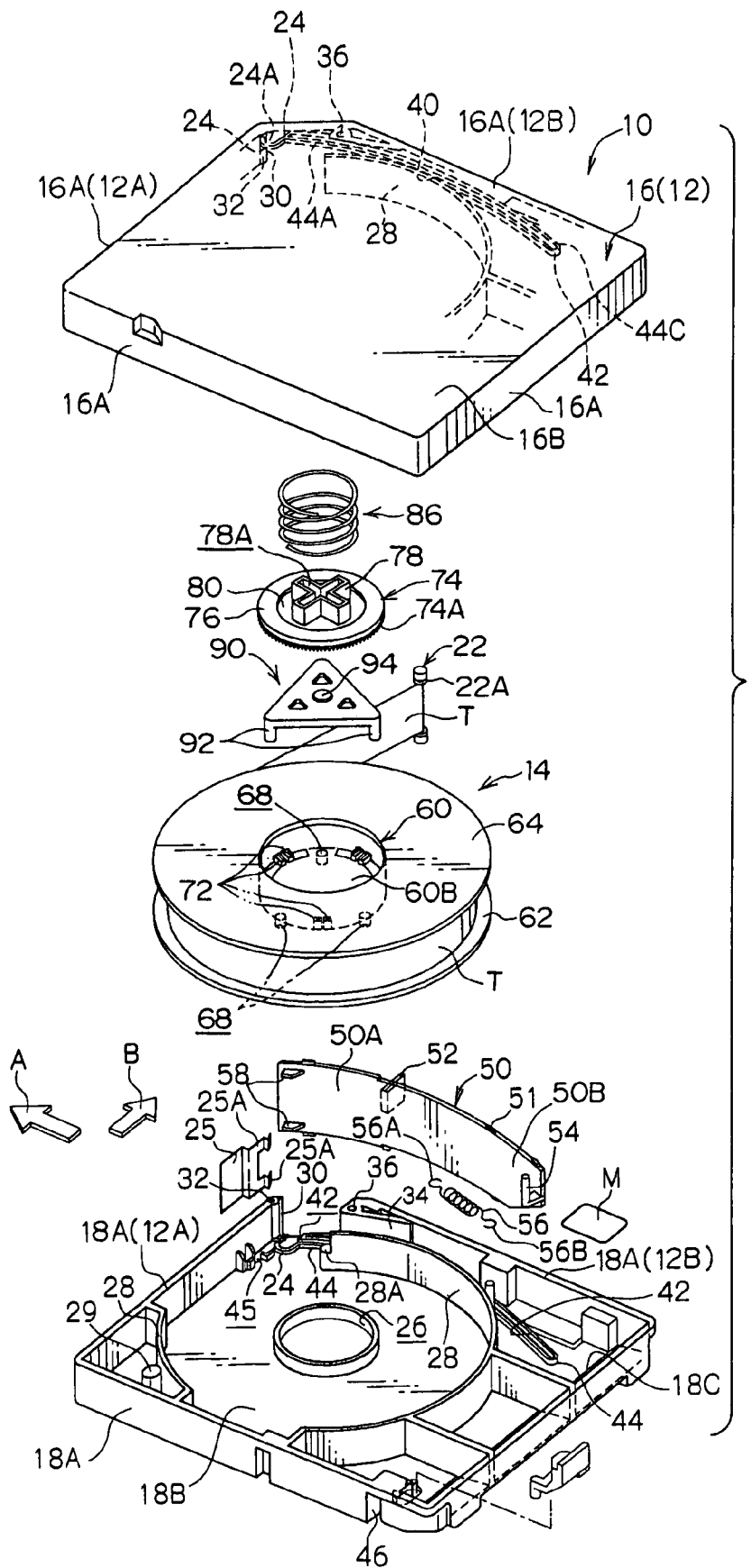
FIG. 2 is an exploded perspective view of the recording tape cartridge relating to the first embodiment of the present invention.

FIG. 1 shows a perspective view of overall structure of the recording tape cartridge 10. FIG. 2 shows a schematic exploded perspective view of the recording tape cartridge 10.

As shown in these drawings, the recording tape cartridge 10 is structured to rotatably accommodate the single reel 14 in a case 12. The case 12 is substantially rectangular in plan view. A magnetic tape T is wound onto the reel 14. The magnetic tape T serves as a recording tape which is an information recording/replaying medium. Structure of this reel will be described later.

The case 12 is structured by matching up and joining two peripheral walls 16A and 18A of an upper case 16 and a lower case 18 to one another. A front-right corner portion of each of the upper case 16 and the lower case 18, which is a single corner portion at a front end side in the direction of loading into the drive device, is cut away. An accommodation space for the reel 14, onto which the magnetic tape T is wound, is provided inside the case 12. Hence, the cut away corner portions of the peripheral walls 16A and 18A of the upper case 16 and the lower case 18 serve as an opening 20 for drawing out the magnetic tape T. Details of the opening 20 and a door 50, which opens and closes the opening 20, will be described later.

A leader pin 22 is connected at a free end of the magnetic tape T which is to be drawn out through the opening 20. The leader pin 22 is caught up (engaged) by drawing-out means of the drive device, and subjected to a drawing-out operation. At each of two end portions of the leader pin 22, which protrude beyond width direction end portions of the magnetic tape T, an annular groove 22A is formed. These annular grooves 22A are caught on to by hooks or the like of the drawing-out means. Consequently, in this structure, the hooks or the like do not contact and damage the magnetic tape T when the magnetic tape T is drawn out.

At an inner side of the opening 20 of the case 12, a pair of upper and lower pin stands 24 are provided for positioning and retaining the leader pin 22 in the case 12. The pin stands 24 have semi-tubular forms which open toward the direction of arrow B, and both the end portions of the leader pin 22 are held at recess portions 24A of the pin stands 24 in a state in which the leader pin 22 is standing thereat. The pin stands 24 join with ribs 44, which are described below.

A leaf spring 25 is fixedly disposed in a vicinity of the pin stands 24. The leaf spring 25 engages with upper and lower end portions of the leader pin 22, and holds the leader pin 22 at the pin stands 24. The leaf spring 25 has a structure in which an arm portion 25A resiliently deforms as appropriate to allow movement of the leader pin 22 when the leader pin 22 is removed or inserted at the pin stands 24.

A gear aperture 26 is formed at a central portion of the lower case 18. The gear aperture 26 serves as an 'aperture' of the present invention for exposing a reel gear 66 (which is described later) of the reel 14 to the outside. The reel gear 66 meshes with a driving gear of a drive device and drives the reel 14 to rotate inside the case 12. The reel 14 is held by free play-restricting walls 28 so as not to rattle about. These free play-restricting walls 28 are projectingly provided at interior surfaces of the upper case 16 and the lower case 18, to serve as interior walls which are disposed along portions of a circular path which is coaxial with the gear aperture 26. Further, at the 18, at edge portions of the gear aperture 26, an annular rib 26A is provided protruding toward the inside of the case 12. The annular rib 26A is used for positioning of the reel 14.

A hollow portion 28A is provided continuously with an end portion of the free play-restricting walls 28 in a vicinity of the opening 20. A hole for regulation of position is formed at an interior portion of the hollow portion 28A. In addition, a hollow portion 28B is standingly provided in a space which is sandwiched between the free play-restricting walls 28 and a front-left corner portion of the case 12. Another hole for regulation of position, which is a long hole, is formed in the hollow portion 28B. The hollow portions 28A and 28B are disposed co-linearly along the direction of arrow B. Except for an end portion at which the hollow portion 28A is continuously provided, end portions of each of the free play-restricting walls 28 are provided to be continuous with the peripheral wall 16A or the peripheral wall 18A of the case 12. Thus, an outer side of the free play-restricting walls 28 is set apart from the space for disposing the reel 14.

A memory board M is disposed at a rear-right portion of the lower case 18. The memory board M stores various kinds of information for each individual recording tape cartridge 10. A portion of a rear wall 18C, which structures the peripheral wall 18A, is inclined to the extent of a predetermined angle and the memory board M is disposed to be inclined at the predetermined angle. Hence, the memory board M can be detected at a drive device, which reads the memory board M from a lower face side, and at a library apparatus, which reads the memory board M from a rear face side.

Structure of Opening and of Case at Opening Vicinity

Figure 3:
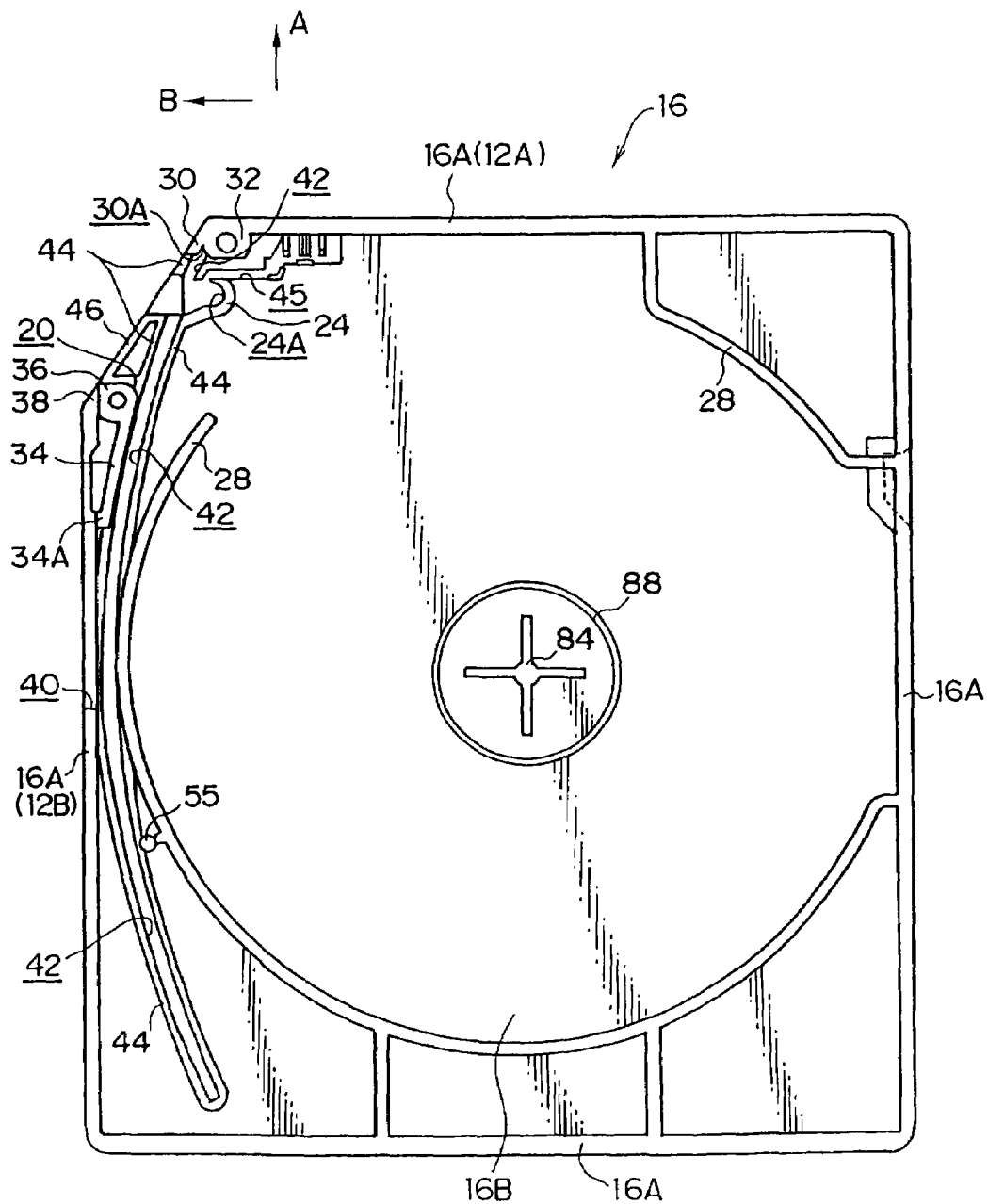
FIG. 3 is a bottom view of an upper case which structures the recording tape cartridge relating to the first embodiment of the present invention.
Figure 4:
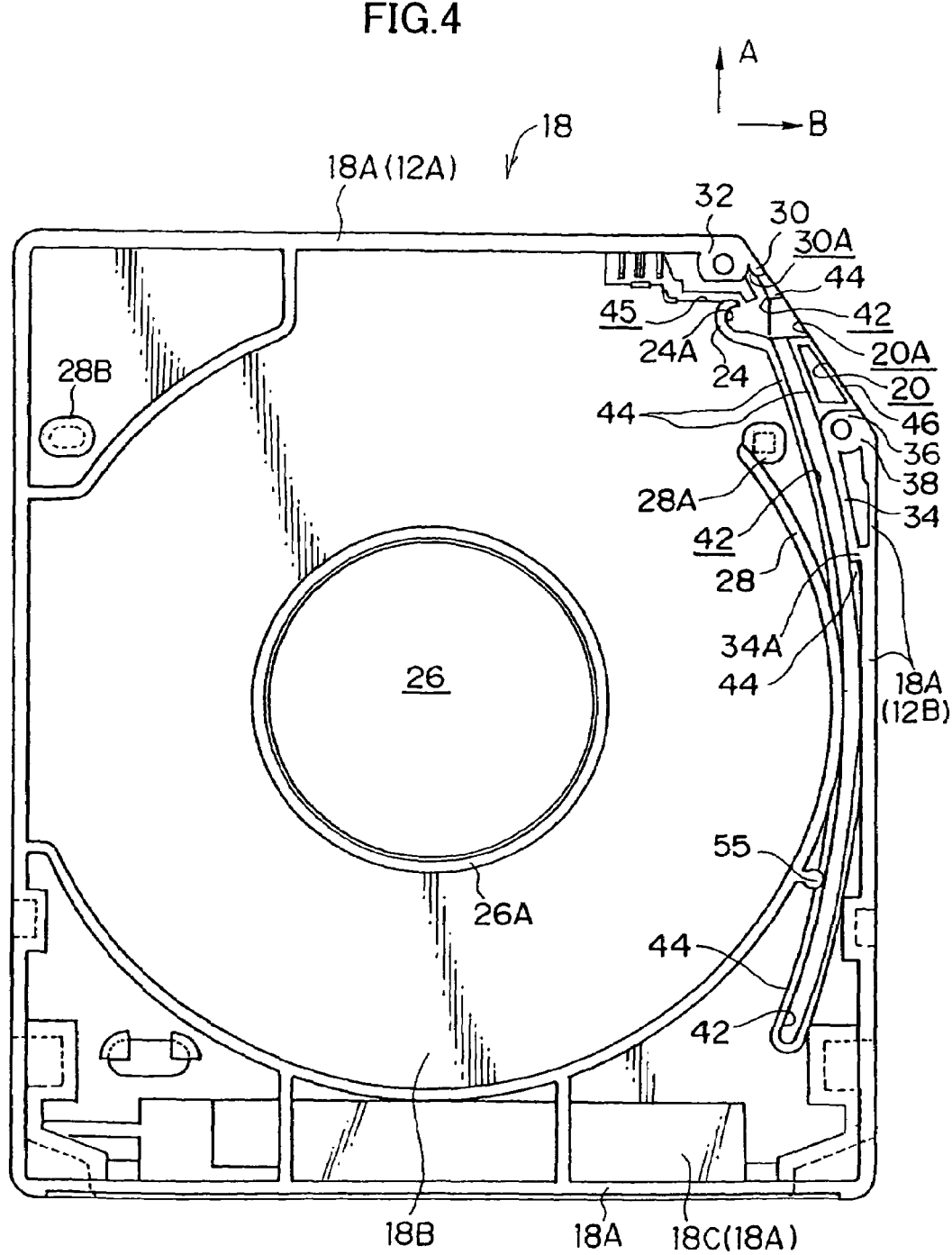
FIG. 4 is a plan view of a lower case which structures the recording tape cartridge relating to the first embodiment of the present invention.

As shown in FIG. 3, which is a bottom view of the upper case 16, and FIG. 4, which is a plan view of the lower case 18, respective pairs of upper and lower screw bosses 32 and screw bosses 36 are provided at front and rear edge portions of the opening 20. Together with other screw bosses, which are not shown, the screw bosses 32 and 36 are for screw-fixing to join the upper case 16 and the lower case 18 together.

The screw bosses 32, which are disposed at the front edge portion of the opening 20, are provided continuously with both a right end portion of a front wall 12A of the case 12 (a portion of the peripheral walls 16A and 18A whose outer surface faces in the direction of arrow A) and a pair of short upper and lower anti-dust walls 30, which is inflected along an opening face of the opening 20 from the right end portion of the front wall 12A. A recess portion 30A is formed between the screw bosses 32 and the anti-dust walls 30. A distal end portion of the door 50, which is described later, enters into the recess portion 30A.

At the screw bosses 36, which are located at the rear edge portion of the opening 20, a front end portion of a right wall 12B of the case 12 (a right side wall portion of the peripheral walls 16A and 18A, which runs along the direction of arrow A) is provided continuously with both an inflected wall 38, which is inflected to run substantially along the opening face of the opening 20, and a front end portion of a pair of upper and lower circular arc walls 34, which pair is provided at an inner side of the right wall 12B. The upper and lower circular arc walls 34 are respectively formed in circular arc shapes substantially corresponding to an outer peripheral face of the later-described door 50 (and to a movement path of the door 50) in plan view. The circular arc walls 34 respectively protrude rearward to the extent of a predetermined length from the screw bosses 36. A rear end portion of the circular arc walls 34 is joined with the right wall 12B (the peripheral wall 16A and the peripheral wall 18A) via a short joining wall 34A.

A slit 40 is provided in the right wall 12B of the case 12. The slit 40 has a predetermined length and serves as a window portion which communicates between the interior and exterior of the case 12. The slit 40 is for exposing an operation projection 52 of the later-described door 50. The slit 40 is formed by cutting away a lower portion of the peripheral wall 16A that structures the right wall 12B. A lower portion of the inflected wall 38 of the upper case 16 is also cut away. Thus, the slit 40 also opens forward.

Guide grooves 42 for guiding the door 50 are formed in the upper case 16 and lower case 18 structuring the case 12. Groove walls of the guide grooves 42 are structured by ribs 44, which are provided standing from a ceiling plate 16B of the upper case 16 and a floor plate 18B of the lower case 18, by the right wall 12B (the peripheral wall 16A and the peripheral wall 18A), and by the free play-restricting walls 28. Thus, the guide grooves 42 are formed without reducing thickness of the ceiling plate 16B and the floor plate 18B. The ribs 44 are provided continuously with the pin stands 24.

Each of the guide grooves 42 is formed in a circular arc shape along a predetermined circular circumference. The recess portion 30A serves as an end portion of the guide grooves 42, and the guide grooves 42 reach therefrom to a rear-right corner portion of the case 12. The predetermined circular circumference is determined so as to pass (thread) between the right wall 12B and the free play-restricting walls 28 at an outer side of the screw bosses 32 and at an inner side of the screw bosses 36. A center point of the predetermined circular circumference (a center of rotation of the later-described door 50) is specified such that a position (coordinate) thereof in the left-right direction is at an outer side relative to a left end of the case 12 and a position (coordinate) thereof in the front-rear direction substantially corresponds to a center of rotation of the reel 14 (which is at a center point of the free play-restricting walls 28).

At a portion of the guide channels 42 that is located at the opening 20, the ribs 44 are cut away rightward of the pin stands 24. Thus, the guide channels 42 are communicated with the recess portions 24A, and are communicated with a spring groove 45, at which the arm portion 25A of the leaf spring 25 is disposed. At this cut-away portion of the guide grooves 42, A tapering opening 20A, which guides the leader pin 22 into the case 12, is communicated with the recess portions 24A of the pin stands 24. Ribs 46, which are formed along each of a rear edge of the tapering opening 20A, a front end of the screw bosses 36, and the opening face of the opening 20 are provided continuously with the ribs 44B. Thus, strength of surroundings of the opening 20 of the case 12 is preserved or improved in spite of the ribs 44 having been cut away.

Rear ends of the ribs 44, which structure rear half portions of the guide grooves 42, curve back on themselves in substantial U shapes. The rib 44 of the upper case 16 is formed to extend further to the rear than the rib 44 of the lower case 18. The purpose of this is to prevent interference between the door 50 and the memory board M disposed at the right wall 12B side of the rear wall 18C, which rear wall 18C (of the peripheral wall 18A) of the lower case 18 is a surface inclined at a predetermined angle.

A pair of upper and lower spring-engaging pins 55 are provided at a length direction central portion of the rear half portion of the ribs 44, at an inner side portion thereof. Each spring-engaging pin 55 is provided continuously with the free play-restricting walls 28. The lower case 18 side spring-engaging pin 55 is formed to be longer, and a portion thereof which protrudes further upward than the corresponding free play-restricting wall 28 is a structure at which a one end side annular portion 56A of a coil spring 56, which is described later, hooks on. Then, the upper case 16 side spring-engaging pin 55, which is shorter, matches up with the lower case 18 side spring-engaging pin 55, and disengagement of the coil spring 56 is blocked.

In a state in which the peripheral walls 16A and 18A of the upper case 16 and lower case 18 described above are matched together, unillustrated screws are screwed into the screw bosses 32, the screw bosses 36 and other screw bosses from the lower side, and the screw bosses are fixed (joined) to structure the case 12. Here, because the opening 20 is formed by cutting away the front-right corner portion of the rectangular case 12, the opening face of the opening 20 faces in the direction of arrow A and in the direction of arrow B. Consequently, the drawing-out means of a drive device can access and chuck the leader pin 22 from the direction of arrow A, from the direction of arrow B, or from a direction between the directions of arrow A and arrow B. As a result, an area in which the pin stands 24 that hold the leader pin 22 can be disposed is large, and a range from which drawing-out means of drive devices can chuck the leader pin 22 is wide. Accordingly, a position at which the pin stands 24 are disposed can be specified to meet specifications of drive devices that carry out chucking from direction A and drive devices that carry out chucking from direction B. Thus, a degree of freedom of design of the drive devices is broadened.

Structure of Door

The opening 20 described above is opened and closed by the door 50, which serves as a covering member. The door 50 is curved in a plate thickness direction thereof and is formed in a circular arc form whose curvature substantially coincides with the curvature of the guide grooves 42 (the predetermined circular circumference) in plan view. A portion of the door 50 at a front half portion thereof (at least a portion which closes off the opening 20) serves as a closing portion 50A, which is formed with a plate breadth (height) set to be substantially the same as an opening height of the opening 20. A portion of the door 50 that is rearward relative to the closing portion 50A serves as a driven portion 50B, with a plate breadth which is set to be slightly smaller.

Figure 5A:
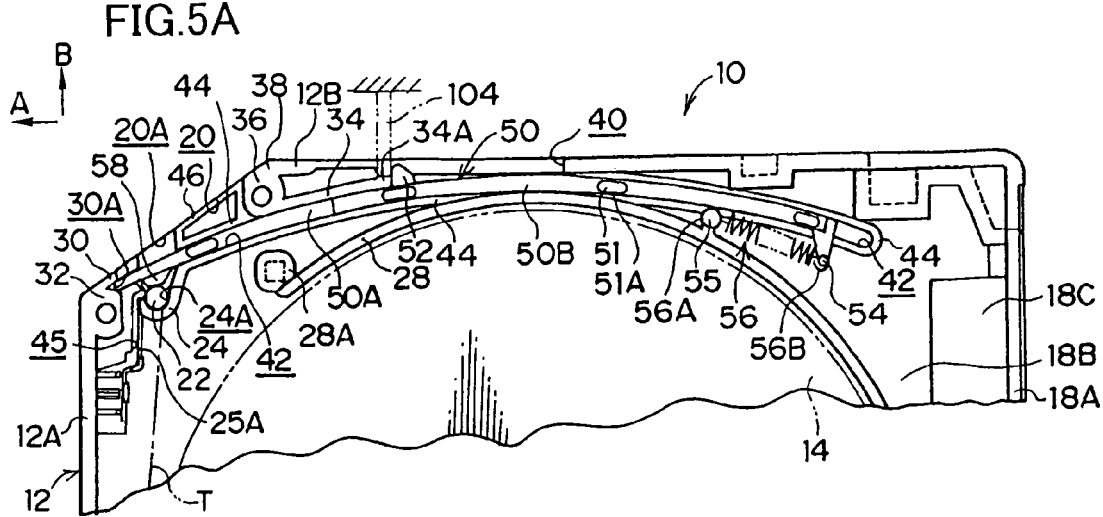
FIG. 5A is a plan view showing an opening process of an opening of the recording tape cartridge relating to the first embodiment of the present invention, viewed with the upper case removed, which shows an initial state of engagement of an engaging protrusion of a drive device with an operation projection of a door.

The plate length of the door 50 (the curved length dimension) is determined such that, in a state in which the opening 20 is closed, a rear end portion of the driven portion 50B is disposed inside the rear-right corner portion of the case 12 (see FIG. 5A). A lower-rear portion of the driven portion 50B is cut away at an angle in order to avoid the memory board M which is disposed at the inclined surface of the rear wall 18C.

Thus, the door 50 is a structure which closes the opening 20 in a state in which a distal end portion of the closing portion 50A enters into the recess portion 30A located at the outer side of the screw bosses 32 (see FIG. 5A). The door 50 moves (rotates) substantially rearward along the guide grooves 42 to open the opening 20 (see FIG. 5B). When an outer peripheral face of a distal end vicinity of the closing portion 50A has reached a vicinity of an inner side of the screw bosses 36, the opening 20 is completely opened (see FIG. 5C). When the opening 20 is open, the door 50 can close the opening 20 by rotating substantially in the opposite direction.

Thus, the door 50 is formed to be curved so as to open and close the opening 20 by rotating along a movement path thereof without deviating from the predetermined circular circumference. The center and radius of rotation of the door 50 (the shape of the guide grooves 42) can be suitably determined in accordance with positions of the front and rear edge portions of the opening 20 (the screw bosses 32 and 36), which are determined by requirements of the drive device, with an angle of the opening face of the opening 20, which is determined by requirements of the library apparatus, and the like.

A plurality of protrusion portions 51 are protrudingly provided at upper and lower ends of the door 50 and enter into the upper and lower guide grooves 42, respectively. The protrusion portions 51 have different protrusion heights from the closing portion 50A and the driven portion 50B, but distances from a breadth direction center line of the door 50 (along the length direction thereof) to peak portions of the protrusion portions 51 are constant. Thus, the upper and lower protrusion portions 51 slide against the ceiling plate 16B and the floor plate 18B, which are floor portions of the guide grooves 42.

Figure 5B:
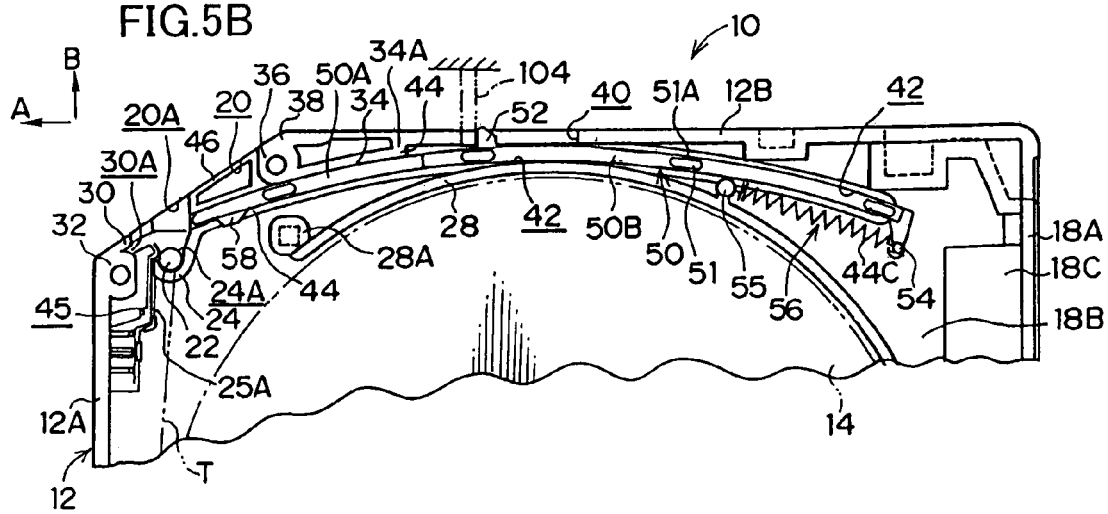
FIG. 5B is a plan view showing the same opening process, which shows a state during opening of the opening.
Figure 5C:
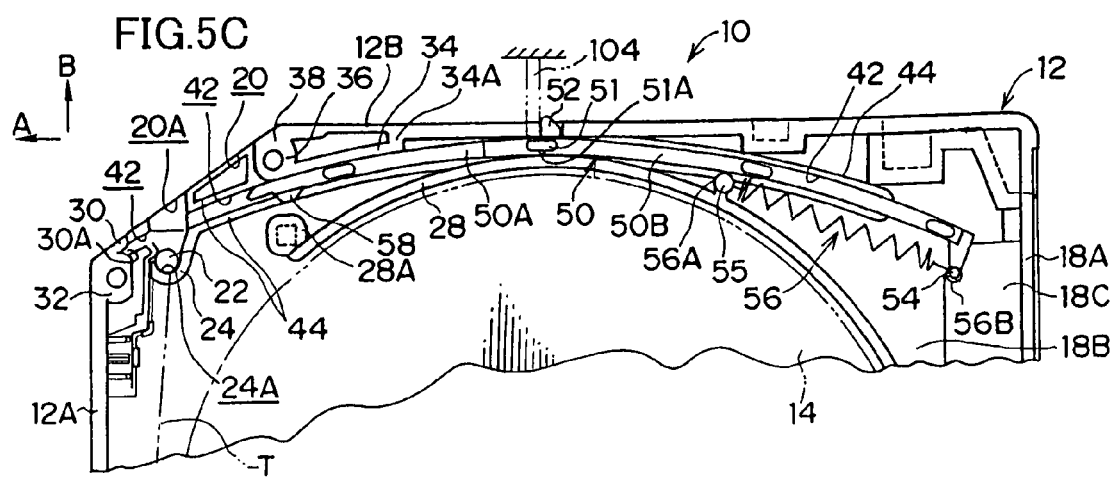
FIG. 5C is a plan view showing the same opening process, which shows a state of completed opening of the opening.

Protrusions 51A are protrudingly provided at the protrusion portions 51, at both sides in the plate thickness direction of the door 50 (see FIGS. 5A to 5C). Peak portions of the protrusions 51A are in line with plate thickness direction faces of the door 50. The protrusions 51A slide against the groove walls of the guide grooves 42 (the ribs 44 and the like). The protrusion portions 51 that are located furthest toward the front are disposed so as to enter into the tapering opening 20A, which communicates with the guide grooves 42, during the opening/closing process of the opening 20.

Because of the protrusion portions 51 and the protrusions 51A, the door 50 is a structure which is guided in the guide grooves 42 when opening/closing the opening 20, and reliably moves to open by threading between the right wall 12B and the free play-restricting walls 28, at the outer side of the screw bosses 32 and the inner side of the screw bosses 36, without deviating from the aforementioned movement path thereof.

At an outer peripheral portion of the door 50, at a front end vicinity (the closing portion 50A side) of the driven portion 50B, the operation projection 52 projects along a diametric direction of the door 50, to serve as an operation portion. The operation projection 52 is exposed to the outside of the case 12 through the slit 40. With the operation projection 52 of this structure, in accordance with loading (relative movement) of the recording tape cartridge 10 into the drive device, an engagement protrusion 104 advances in through the portion of the slit 40 which opens frontward, engages with the operation projection 52, and moves the door 50 in the direction of opening the opening 20.

A spring-holding portion 54, which has the form of a substantial L-shape toward an inner face side of the door 50, is protrudingly provided at a rear end portion of the driven portion 50B of the door 50. The spring-engaging portion 54 has a free end at an upper end side thereof. The coil spring 56, which serves as an urging means, is engaged and retained at the spring-engaging portion 54. Specifically, the annular portion 56A and an annular portion 56B are provided at respective end portions of the coil spring 56 for engagement. The annular portion 56A is passed through by the spring-engaging pins 55 of the case 12 and is engaged and retained at the case 12, and the annular portion 56B is passed through by the spring-engaging portion 54 and is engaged and retained at the door 50.

Accordingly, in this structure, the door 50 is urged in the direction of closing the opening 20 by urging force of the coil spring 56, and the door 50 usually closes the opening 20. The coil spring 56 has a length that reaches as far as the rear-right corner portion of the case 12 in the state in which the door 50 closes the opening 20 as described above. Thus, the coil spring 56 is disposed so as to effectively utilize a space between the free play-restricting walls 28 and the peripheral walls 16A and 18A (the rear wall 18C) at the rear-right corner portion.

Stoppers 58 are protrudingly provided at the inner face of the closing portion 50A of the door 50. The stoppers 58 abut against an upper end portion side face and a lower end portion side face of the leader pin 22 when the opening 20 is closed. Thus, detachment of the leader pin 22 from the pin stands 24 by falling impacts and the like can be reliably prevented.

With the door 50 of the structure described above, the operation projection 52 is engaged with the engagement protrusion 104 of the drive device by an operation of loading the recording tape cartridge 10 into the drive device (see FIGS. 5A to 5C). Thus, the door 50 moves relative to the case 12, against the urging force of the coil spring 56, and opens the opening 20. At a time of ejection from the drive device, the opening 20 is closed by the urging force of the coil spring 56.

Further, the door 50, which is curvedly formed in the circular arc shape, is rotated to open and close the opening 20, which is angled with respect to the direction of arrow A, by swinging around an outer side of the reel 14 and the pin stands 24 (and the leader pin 22) without deviating from the movement path along the shape of the curvature. Thus, the door 50 is a structure which will not protrude beyond an external profile region of the case 12 during opening and closing of the opening 20.

Structure of Reel and Brake Structure

Figure 6:
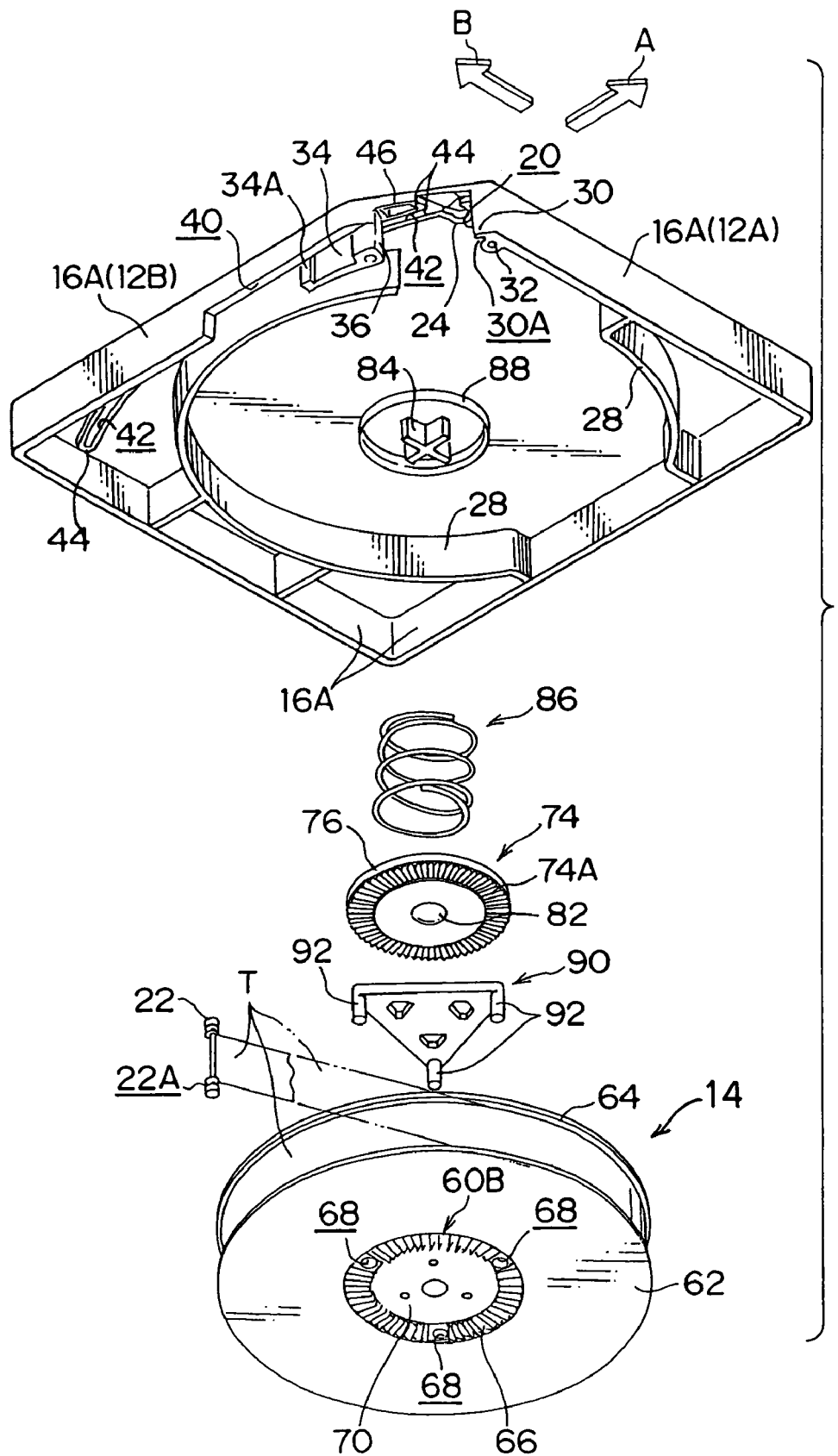
FIG. 6 is an exploded perspective view, viewed from below, showing a reel and a brake structure which structure the recording tape cartridge relating to the first embodiment of the present invention.

As is shown in FIGS. 2 and 6, the reel 14 is provided with a reel hub 60 with the form of a substantially circular tube with a base. The reel hub 60 includes a tubular portion 60A and a base portion 60B. The magnetic tape T is wound onto the tubular portion 60A at an outer peripheral face thereof. The base portion 60B closes off a lower portion of the tubular portion 60A. At a vicinity of the base portion 60B side end portion (lower end portion) of the reel hub 60, a lower flange 62 is coaxially and integrally provided at the diametric direction outer side of the reel hub 60. Further, an upper flange 64 is coaxially joined to an upper end portion of the reel hub 60 by ultrasonic welding or the like. An internal diameter of the upper flange 64 is set to be substantially the same as an internal diameter of the tubular portion 60A, and an external diameter of the upper flange 64 is set to be the same as an external diameter of the lower flange 62.

Thus, at the reel 14, the magnetic tape T is wound round the outer peripheral face of the tubular portion 60A of the reel hub 60 between opposing faces of the lower flange 62 and the upper flange 64, and the tubular portion 60A opens upward. The external diameter of the lower flange 62 and the upper flange 64 is set to be slightly smaller than an internal diameter of the free play-restricting walls 28 of the case 12. Thus, the reel 14 is rotatable inside the case 12.

Figure 7:
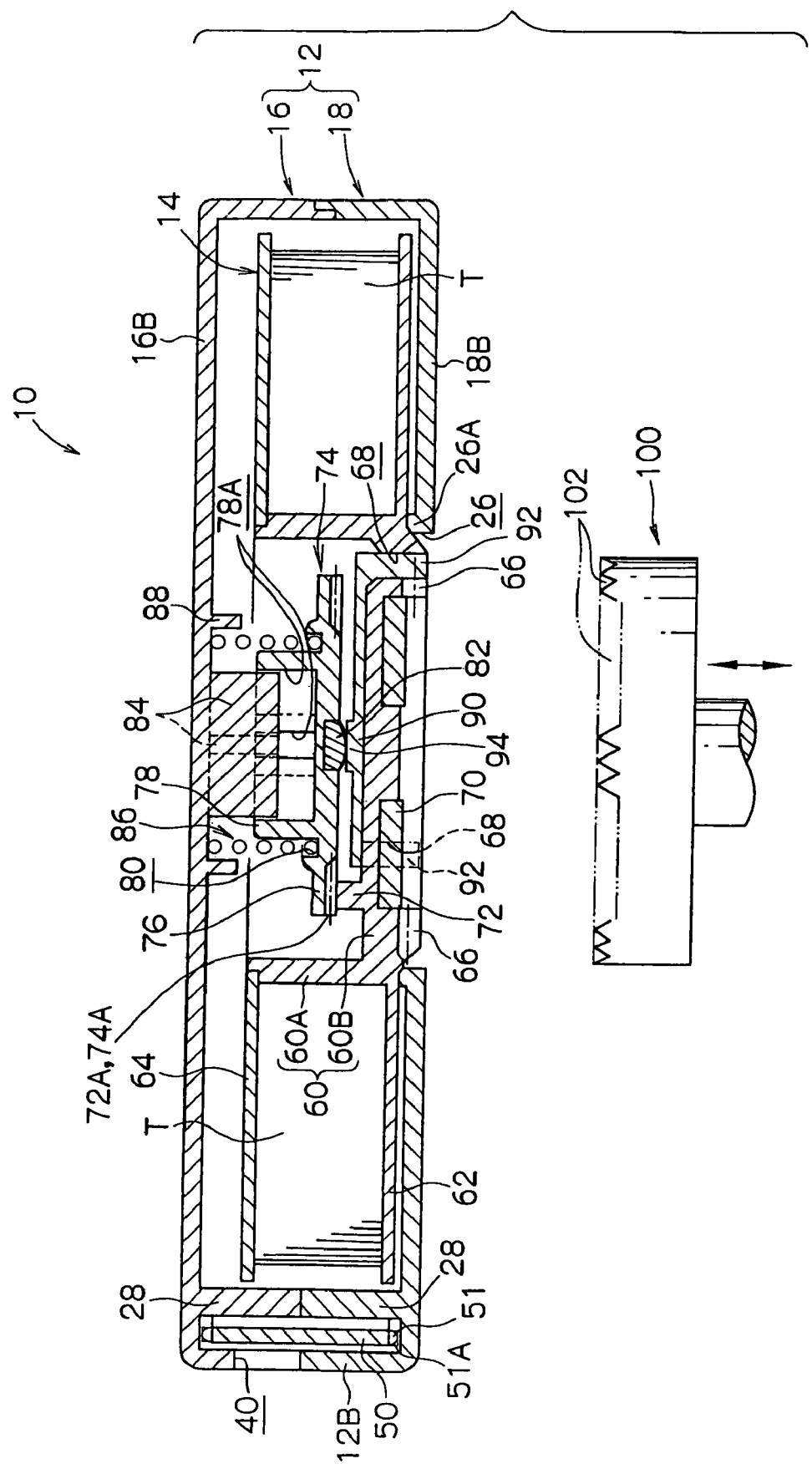
FIG. 7 is a sectional view showing a rotation-locked state of the reel of the recording tape cartridge relating to the first embodiment of the present invention.

As shown in FIG. 7, a lower peripheral portion of the base portion 60B of the reel hub 60 protrudes slightly beyond a lower face of the lower flange 62, and the reel gear 66, which is formed in an annular shape, is provided at an outer peripheral vicinity of a lower end face of the base portion 60B. The reel gear 66 is specified so as to be meshable with a driving gear 102, which is provided at a distal end of a rotation shaft 100 of the drive device.

Through-holes 68, which pass through the base portion 60B (and the reel gear 66) are provided at three locations, which are equally spaced, on a circular periphery at the portion at which the reel gear 66 is disposed. A diameter of each through-hole 68 is greater than a gear pitch of the reel gear 66, and the teeth of the reel gear 66 are not provided in a vicinity of each through-hole 68.

A reel plate 70, which is an annular plate formed of a magnetic material which is capable of adsorption by magnetism, is provided at the lower end face of the base portion 60B of the reel hub 60, at the inner side of the reel gear 66. The reel plate 70 is provided integrally by insert-molding.

The lower end portion of the base portion 60B of the reel hub 60, which protrudes beyond the lower flange 62, is inserted (fitted with play) into the gear aperture 26 of the case 12 in a state in which a diametric direction inner end portion of the lower flange 62 abuts against an upper end portion of the annular rib 26A. Thus, the reel gear 66 and the reel plate 70 are exposed to outside the case 12.

Pairs of engaging protrusions 72 (six protrusions in total) are standingly provided at an upper face of the base portion 60B of the reel hub 60 (see FIG. 2). The engaging protrusions 72 are equally spaced on the circular periphery, at three locations between the respective through-holes 68. The engaging protrusions 72 respectively serve as engaging portions in the present invention. Gear teeth 72A are formed at distal end portions (upper end portions) of the engaging protrusions 72 (see FIG. 8). These gear teeth 72A are capable of meshing with a brake gear 74A of a brake member 74, which is described later.

The recording tape cartridge 10 is further equipped with a brake structure for blocking rotation of the reel 14 at times of non-use. This brake structure is equipped with the brake member 74, which serves as a 'brake member' of the present invention. The brake member 74 is provided with a disc portion 76, which is formed in a substantially circular plate shape. The brake gear 74A, which is meshable with the gear teeth 72A of the reel 14, is formed in an annular shape at an outer peripheral vicinity of a lower end face of the disc portion 76.

As shown in FIG. 2, the brake member 74 is provided with an X-form protrusion 78, which is formed substantial in a cross shape in plan view and is provided standing from an upper face of the disc portion 76. At an interior portion of the X-form protrusion 78, an insertion channel 78A is formed in a shape corresponding to the X-form protrusion 78. In other words, the X-form protrusion 78 structures channel walls of the insertion channel 78A. A spring-holding recess portion 80 is also formed at the upper face of the disc portion 76, at an outer side of the X-form protrusion 78. The spring-holding recess portion 80 is surrounded by a wall portion with an annular shape in plan view.

At this brake member 74, the disc portion 76, at which the brake gear 74A and the spring-holding recess portion 80 of are provided, and the X-form protrusion 78, in which the insertion channel 78A is formed, are integrally formed by resin-molding, and correspond to a main body of the brake member of the present invention. In addition, the brake member 74 is provided with a rubbing protrusion portion 82, which is structured by a metallic member and is embedded at an axial center lower portion of the disc portion 76.

Figure 9:
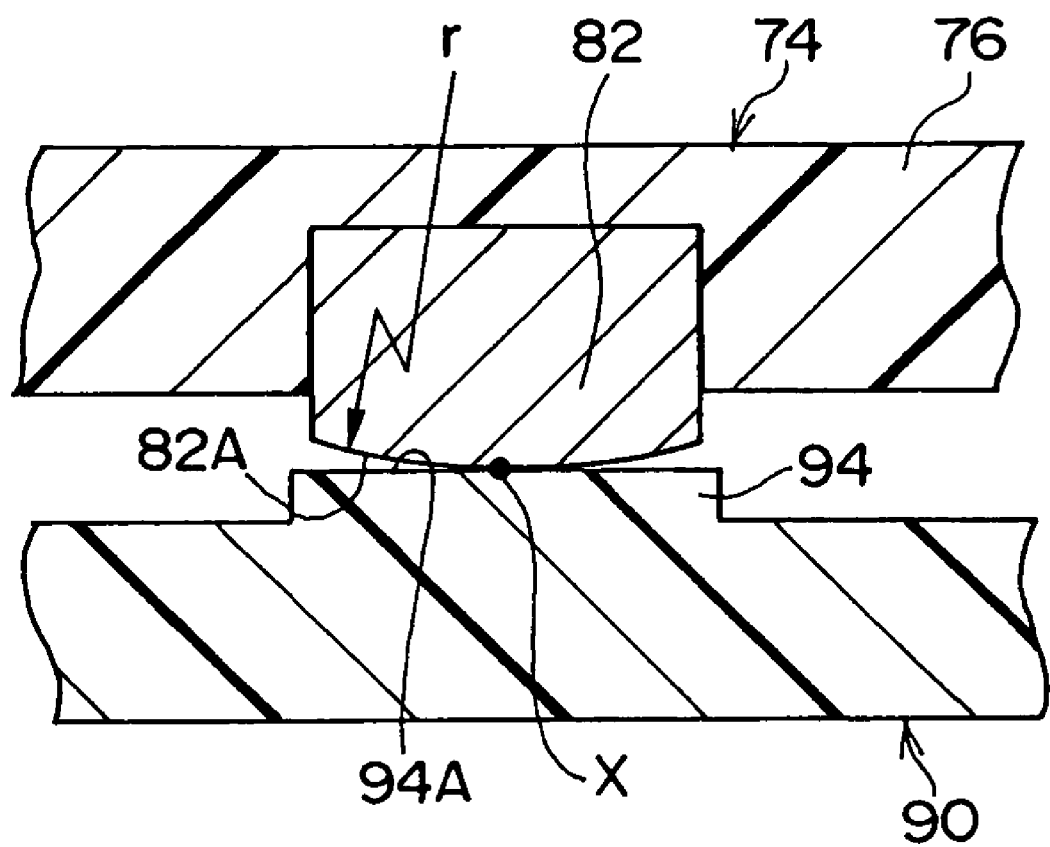
FIG. 9 is a partial enlarged sectional view showing an abutting portion of a brake member and a release pad which structure the recording tape cartridge relating to the first embodiment of the present invention.

A rubbing surface 82A of the rubbing protrusion portion 82 protrudes downward relative to the lower face of the disc portion 76 (see FIG. 9). The rubbing protrusion portion 82 structures a portion of the brake member 74 that abuts against a release pad 90, which is described later. Details thereof will be given later.

The brake member 74 described above is insertedly disposed in the tubular portion 60A of the reel hub 60 so as to be movable in a vertical direction (an axial direction of the reel 14) and substantially coaxial with the tubular portion 60A. Thus, when the brake member 74 moves in the vertical direction, the brake gear 74A of the brake member 74 can attain a position at which the brake gear 74A meshes with the gear teeth 72A of the engaging protrusions 72 provided at the reel hub 60 (a rotation-locking position) or a position at which this meshing is released (a rotation-enabling position).

An X-form rib 84 (see FIGS. 3 and 6), which serves as an engaging protrusion, is provided protruding downward from the ceiling plate 16B of the case 12. The X-form rib 84 enters into the insertion channel 78A of the X-form protrusion 78 of the brake member 74. With this structure, rotation of the brake member 74 relative to the case 12 is blocked by engagement of the X-form protrusion 78 (i.e., the channel walls of the insertion channel 78A) with the X-form rib 84.

Accordingly, in a state in which the brake member 74 is disposed at the rotation-locking position and the brake gear 74A is meshed with the gear teeth 72A of the reel hub 60, rotation of the reel 14 is blocked. The X-form rib 84 is maintained in a state of being inserted in the X-form protrusion 78 over the whole of a movement stroke of the brake member 74 in the vertical direction. Thus, this is a structure which provides a function of guiding directions of movements of the brake member 74 to the vertical direction.

A compression coil spring 86, which serves as an 'urging structure' of the present invention, is disposed between the spring-holding recess portion 80 of the brake member 74 and the ceiling plate 16B. One end portion of the compression coil spring 86 is fitted into the spring-holding recess portion 80 and the other end portion is fitted inside an annular wall portion 88, which is provided protruding from the ceiling plate 16B. Thus, the compression coil spring 86 will not be displaced in diametric directions thereof.

In this structure, as shown in FIG. 7, the brake member 74 is urged downward by urging force of this compression coil spring 86, the brake gear 74A is meshed with the gear teeth 72A, and the brake gear 74A reliably prevents undesired rotation of the reel 14 (i.e., the brake member 74 is disposed at the rotation-locking position). Also due to this urging force, the reel 14 whose engaging protrusions 72 are meshed with the brake member 74 is urged downward and, as mentioned earlier, the lower flange 62 abuts against the annular rib 26A such that the reel 14 is not loose inside the case 12.

The release pad 90, which serves as a release member of the present invention, is disposed between the base portion 60B and the brake member 74 inside the reel hub 60 (the tubular portion 60A) of the reel 14. The release pad 90 is formed in a flat plate form with a substantially equilateral triangle shape in plan view. Three circular column-form leg portions 92 are provided protruding from a lower face of the release pad 90 at a vicinity of each corner portion thereof. The leg portions 92 correspond, respectively, with the through-holes 68 of the base portion 60B.

A rubbing protrusion portion 94 is provided at a central portion of an upper face of the release pad 90. The rubbing protrusion portion 94 abuts against the rubbing protrusion portion 82 of the brake member 74. Details of the rubbing protrusion portion 94 will be given later.

In a state in which the leg portions 92 are inserted through the through-holes 68, so as to be movable in the vertical direction, the release pad 90 rests on the base portion 60B of the reel hub 60 so as not to interfere with the engaging protrusions 72 (the lower face of the release pad 90 abuts against the upper face of the base portion 60B). In this state, the leg portions 92 protrude beyond lower end portions of the through-holes 68 such that distal ends of the leg portions 92 are at substantially the same level as tooth peaks of the reel gear 66. Thus, in this structure, when the rubbing protrusion portion 94 abuts against the rubbing protrusion portion 82 of the brake member 74, the release pad 90 is maintained in this state, in which the leg portions 92 are protruding, by the urging force of the compression coil spring 86.

However, if the leg portions 92 are pushed to move upward against the urging force of the compression coil spring 86, the release pad 90 pushes the brake member 74, which is abutting against the rubbing protrusion portion 94 of the release pad 90, upward and releases the meshing of the brake member 74 with the gear teeth 72A of the engaging protrusions 72 (i.e., moves the brake member 74 to the release position).

Figure 8:
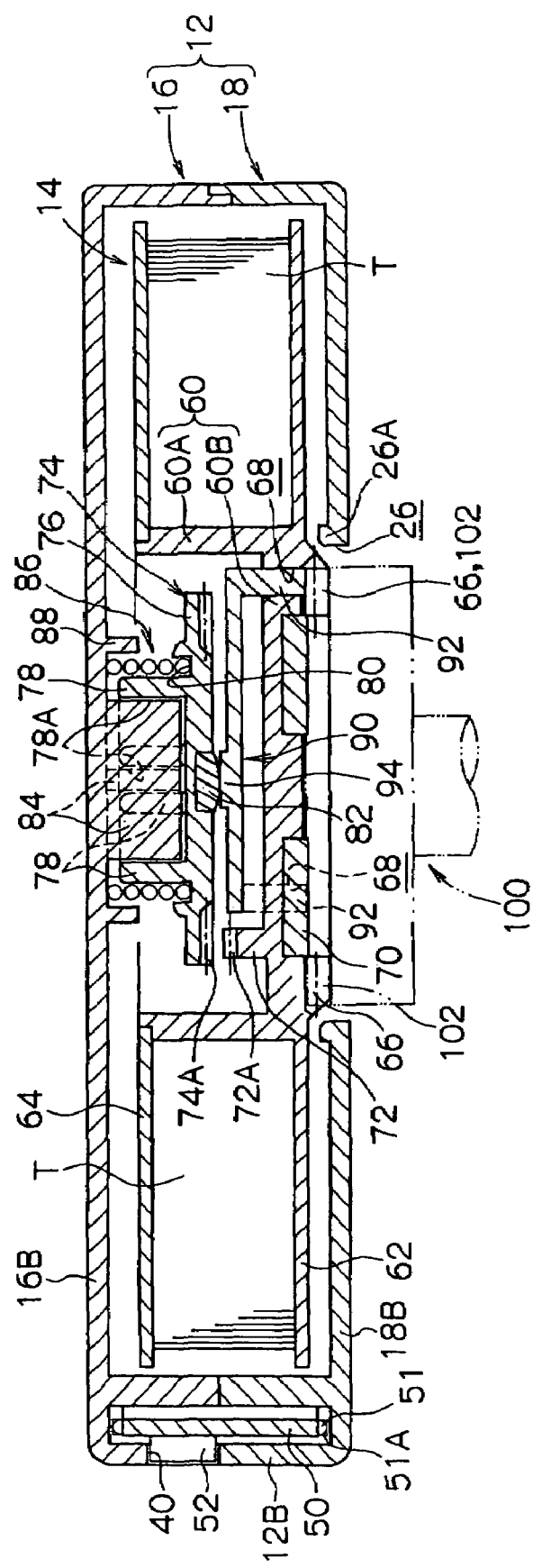
FIG. 8 is a sectional view showing a rotation-enabled state of the reel of the recording tape cartridge relating to the first embodiment of the present invention.

Specifically, as shown in FIG. 8, at a time when the driving gear 102 meshes with the reel gear 66 of the reel 14, the rotation shaft 100 is relatively moving in an upward direction with respect to the case 12, and thus the leg portions 92 of the release pad 90 are pushed by tooth peaks of the driving gear 102.

Thus, in accordance with an operation of meshing the driving gear 102 with the reel gear 66, the reel 14 rises in the case 12 against the urging force of the compression coil spring 86 (i.e., the lower flange 62 is separated from the annular rib 26A), the rotation-locking state caused by the brake member 74 is released, and the reel 14 becomes rotatable in the case 12. In other words, the release pad 90 is a structure which moves the brake member 74 to the rotation-enabling position in accordance with the operation of meshing the driving gear 102 with the reel gear 66, and in states in which the meshing of the driving gear 102 with the reel gear 66 is maintained (at times of use of the recording tape cartridge 10), holds the brake member 74 at the rotation-enabling position.

In this state, the leg portions 92 of the release pad 90 are disposed inside the through-holes 68 of the reel hub 60. Thus, with this structure, the release pad 90 rotates (integrally) with the reel 14 when the rotation shaft 100 rotates.

Therefore, the brake member 74 and the release pad 90 relatively rotate during rotation of the reel 14, and the rubbing protrusion portions 82 and 94, which are abutting portions of the brake member 74 and the release pad 90 rub against one another. Now, the rubbing protrusion portions 82 and 94 will be described.

As shown in FIG. 9, the rubbing protrusion portion 82, which is the metallic member that is embedded at the axial center lower portion of the disc portion 76 and structures the brake member 74, is formed in a short circular column shape, and the rubbing surface 82A, which is the one end face of the rubbing protrusion portion 82 that protrudes beyond the lower face of the disc portion 76, is formed as a convexly curved surface. Specifically, the rubbing surface 82A is structured as a convex spherical surface with a spherical radius r of at least 14 mm, and a peak portion X thereof coincides with the axial center of the brake member 74. The rubbing surface 82A is finished to a mirror surface (with high gloss).

The rubbing protrusion portion 82 at which this rubbing surface 82A is formed is fixed in the state of being embedded in the disc portion 76 by pressure insertion or insert-molding. Thus, the rubbing protrusion portion 82 is structured such that rotation relative to the disc portion 76 does not occur. For a metallic material that structures this rubbing protrusion portion 82, for example, stainless steel may be employed.

Meanwhile, the rubbing protrusion portion 94 is formed in a short circular column shape, and a rubbing surface 94A, which is an upper end face thereof, is formed as a flat surface. This rubbing protrusion portion 94 is structured of a resin material, and is formed integrally with the release pad 90 by resin-molding.

Because of the above, the rubbing surface 82A, which is the convex spherical surface of the rubbing protrusion portion 82, and the rubbing surface 94A, which is the flat surface of the rubbing protrusion portion 94, are substantially in point contact at the peak portion X of the rubbing surface 82A, and this structure alleviates frictional resistance during the aforementioned relative rotation. Thus, with this structure, the peak portion X, which is the position of point contact, coincides with the axial center of the brake member 74. Further, in this structure, the peak portion X coincides with the center of rotation of the reel 14, which is to say a center of rotation of the rubbing protrusion portion 94, and, because the convex spherical surface and the flat surface are in point contact, the state in which the peak portion X coincides with the above-mentioned center of rotation is easily maintained (i.e., resistant to mispositioning).

Next, operation of the first embodiment will be described.

In the recording tape cartridge 10 having the structure described above, the door 50 is entered into the recess portion 30A by the urging force of the coil spring 56 and closes the opening 20 when the recording tape cartridge 10 is not in use (during storage, during transportation, and the like).

As shown in FIG. 7, the urging force of the compression coil spring 86 is transmitted through the brake member 74 which is meshed with the engaging protrusion 72 (and through the release pad 90) to the reel 14. As a result, the lower flange 62 is pressed (abutted) against the annular rib 26A and the reel gear 66 is exposed through the gear aperture 26.

Thus, the brake gear 74A of the brake member 74 is meshed with the gear teeth 72A of the engaging protrusions 72 by the urging force of the compression coil spring 86, and rotation of the reel 14 with respect to the case 12 is blocked. In other words, the brake member 74 is disposed at the rotation-locking position.

In contrast, when the magnetic tape T is to be used, the recording tape cartridge 10 is loaded into a bucket (not shown) of a drive device along the direction of arrow A. In accordance with this loading, the engaging protrusion 104 (see FIGS. 5A to 5C), which is fixed at the bucket, engages with the operation projection 52 of the door 50. Hence, the door 50 rotates substantially rearward and opens the opening 20.

Then, when the recording tape cartridge 10 has been loaded to a predetermined depth in the drive device, the bucket descends, and the rotation shaft 100 of the drive device relatively approaches (moves upward) toward the gear aperture 26 of the case 12 and retains the reel 14. Specifically, the rotation shaft 100 adsorbs and retains the reel plate 70 by means of, for example, an electromagnet (not shown) which is disposed at a distal end portion of the rotation shaft 100, and the driving gear 102 of the rotation shaft 100 is meshed with the reel gear 66.

In accordance with the meshing of the reel gear 66 with the driving gear 102, tooth peaks of the driving gear 102 abut against the distal ends (lower end faces) of the leg portions 92 of the release pad 90, and push the release pad 90 upward against the urging force of the compression coil spring 86. As a result, the brake member 74, which abuts against the release pad 90 at the rubbing protrusion portion 82, also moves upward, and the meshing of the brake gear 74A of the reel plate 70 with the gear teeth 72A of the engaging protrusions 72 is released.

When the rotation shaft 100 moves further upward, the reel 14 pushes the release pad 90 and the brake member 74 up together (i.e., without changing relative positions thereof), against the urging force of the compression coil spring 86, and the lower flange 62 moves away from the annular rib 26A. As a result, the reel 14 rises in the case 12 and becomes rotatable, in a state of non-contact with inner faces of the case 12.

In this state, in which the recording tape cartridge 10 has been positioned within the drive device by the descent of the bucket, the drawing-out means of the drive device draws out the leader pin 22 through the opened opening 20, and accommodates the leader pin 22 at a winding reel of the drive device. Then, the winding reel and the reel 14 (the rotation shaft 100) are driven to rotate synchronously by the drive device, and the magnetic tape T is wound around the winding reel while being sequentially drawn out from the case 12. Information recording/replaying is carried out on the magnetic tape T by a recording/replaying head or the like which is disposed along a predetermined tape path.

At this time, the rubbing protrusion portion 82 of the brake member 74 which is not rotatable with respect to the case 12 rubs, at the peak portion X of the rubbing surface 82A of the rubbing protrusion portion 82, against the rubbing surface 94A of the rubbing protrusion portion 94 of the release pad 90 which, together with the reel 14, rotates relative to the case 12.

Subsequently, when the magnetic tape T has been wound back to the reel 14 again and the leader pin 22 has been retained at the pin stands 24, the magnetic force of the above-mentioned magnet is turned off, the adsorption of the rotation shaft 100 with the reel plate 70 is released, and the bucket in which the recording tape cartridge 10 is loaded rises.

Accordingly, the meshing of the reel gear 66 with the driving gear 102 is released, and the abutting of the driving gear 102 against the leg portions 92 of the release pad 90 is released. Thus, the release pad 90 is moved downward together with the brake member 74 (while maintaining the abutting state thereof) by the urging force of the compression coil spring 86.

Hence, the leg portions 92 of the leg portions 92 respectively protrude through the through-holes 68 as far as the level at which the reel gear 66 is formed, and the brake gear 74A of the brake member 74 meshes with the gear teeth 72A of the engaging protrusions 72. That is, the brake member 74 returns to the rotation-locking position for blocking rotation of the reel 14.

Further, in accordance with the operation of moving the brake member 74 and the release pad 90 by the urging force of the compression coil spring 86, the reel 14 also moves downward, and returns to the initial state thereof, in which the lower flange 62 of the reel 14 abuts against the annular rib 26A and the reel gear 66 is exposed through the gear aperture 26.

When the recording tape cartridge 10 is to be ejected from the bucket, the recording tape cartridge 10 is moved in the direction opposite to the direction of arrow A by the urging force of the coil spring 56 and/or by an unillustrated ejection mechanism. In accordance with this movement, the door 50 closes the opening 20 due to the urging force of the coil spring 56. Thus, the recording tape cartridge 10 is ejected from the drive device and returns to the initial state thereof.

Now, in the recording tape cartridge 10, when the reel 14 is rotating, the brake member 74 and the release pad 90 rub together at mutually abutting portions thereof, which are the metallic rubbing surface 82A and the resin rubbing surface 94A. Therefore, rubbing (sliding) resistance in accordance with this rubbing contact is small, and heat generation at the abutting portions is suppressed. In particular, because the rubbing surface 82A is in point contact with the rubbing surface 94A, at the peak portion X, this rubbing resistance is further alleviated, and heat generation at this rubbing contact portion is further suppressed. Moreover, because the rubbing protrusion portion 82 is structured of a metallic material with high heat conductivity, heat that is generated at the rubbing contact (point contact) portion is conducted within the metallic member that structures the rubbing protrusion portion 82 and is radiated to the exterior thereof, and a rise in temperature at the rubbing contact portion is suppressed. Therefore, even under conditions in which the rotation speed of the reel 14 is higher and the duration of rotation is longer, melting of the resin side rubbing protrusion portion 94 in accordance with the rubbing of the rubbing surface 82A against the rubbing surface 94A will not occur.

Further, the structure that makes the rubbing contact portion a point contact is effected by the metal side rubbing surface 82A being formed as a convex spherical surface whose peak portion X coincides with the axial center of the brake member 74 and the resin side rubbing surface 94A being formed as a flat surface. In other words, rather than the resin side rubbing surface 94A being made to be a protruding surface, which would be susceptible to abrasion or wearing, the rubbing surface 82A is set to a convex spherical surface with a spherical radius of at least 3 mm, which has low impact effect (or invasive effect) on the resin side rubbing surface 94A. Therefore, even under the conditions in which the rotation speed of the reel 14 is higher and the rotation duration is longer, abrasion or wearing of the resin side rubbing surface 94A in accordance with the aforementioned rubbing contact is greatly suppressed. In particular, in this first embodiment, because the metal side rubbing surface 82A is made to be a convex spherical surface whose radius r is at least 14 mm, impact effect by the rubbing surface 82A on the resin side rubbing surface 94A is further reduced, and abrasion and wearing of the rubbing surface 94A are reliably prevented.

Specifically, in results of a test of continuous rotation for several hundred hours, corresponding to an acceleration test, at a maximum speed of rotation of the reel 14 in a case in which a feeding speed of the magnetic tape T was set to 6 m/s, melting and abrasion (wearing) of the resin side rubbing protrusion portion 94 were not observed at all.

Accordingly, the position relative to the case 12 of the brake member 74, which is urged downward by the compression coil spring 86, is fixedly maintained at both the rotation-locking position and the rotation-enabling position. That is, the height level of the rubbing protrusion portion 94 is not reduced in accordance with melting, abrasion or the like of the rubbing protrusion portion 94. Therefore, an insertion length (engagement amount) of the X-form rib 84 of the case 12 in the insertion channel 78A of the brake member 74 will not be reduced. Thus, looseness of the brake member 74, mispositioning of the peak portion X with respect to the rotation center of the reel 14, and the like are prevented. Accordingly, generation of noise and the like in accordance with mispositioning of the peak portion X or the like is prevented.

Thus, with the recording tape cartridge 10 relating to the first embodiment, melting, abrasion and the like at the region of abutting of the brake member 74 with the release pad 90 will not occur during rotation of the reel 14.

Further, with this recording tape cartridge 10, the brake member 74 is structured with the rubbing protrusion portion 82 (the rubbing surface 82A), which is a metallic member, embedded in the disc portion 76, which is fabricated of resin. Therefore, the brake member 74 can be easily provided with a complex shape, while a function of preventing melting, abrasion and the like of the resin side rubbing surface 94A is maintained. That is, the brake gear 74A, the X-form protrusion 78 (and the insertion channel 78A) and the like of the brake member 74 can be provided with ease by resin-molding. In particular, the brake gear 74A, which would be high in cost if machined from metal, can be provided at low cost by resin-molding. Furthermore, an increase in weight of the brake member 74 (and hence of the recording tape cartridge 10) in accordance with the rubbing protrusion portion 82 being made metal can be suppressed.

As described above, the present invention is based on the finding (experimental result) that, when a metal is rubbed against a resin in order to reduce rubbing resistance between members that are relatively rotating while abutting, abrasion and wearing of the resin side rubbing surface can be prevented or greatly suppressed by making the metal side rubbing surface (the rubbing surface 82A) a convex spherical surface with a spherical radius of not less than 3 mm (which includes the case of a flat surface whose radius is infinitely large), and not making the resin side rubbing surface (the rubbing surface 94A) a protruding form. Numerous variations based only on this finding are possible.

Herebelow, some variant examples will be described on the basis of FIGS. 10A to 10D. Note that components and portions that are in essence the same as in the first embodiment are assigned the same reference numerals as in the first embodiment, and descriptions thereof are omitted.

Figure 10C:
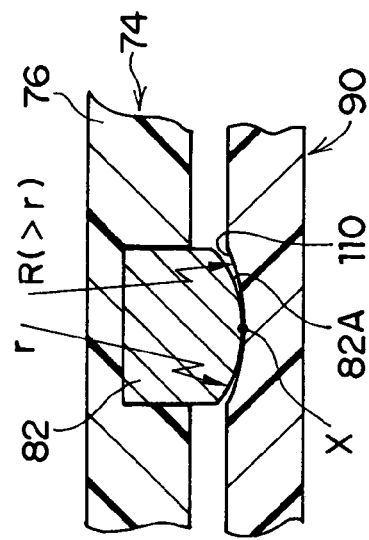
FIG. 10C corresponds to FIG. 9, showing another variant example of the abutting portion, and is a sectional view of a third variant example.
Figure 10D:
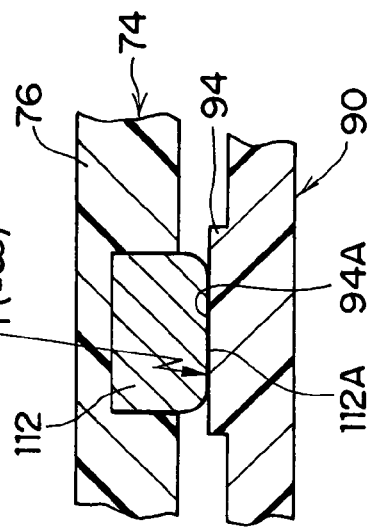
FIG. 10D corresponds to FIG. 9, showing another variant example of the abutting portion, and is a sectional view of a fourth variant example.
Figure 10A:
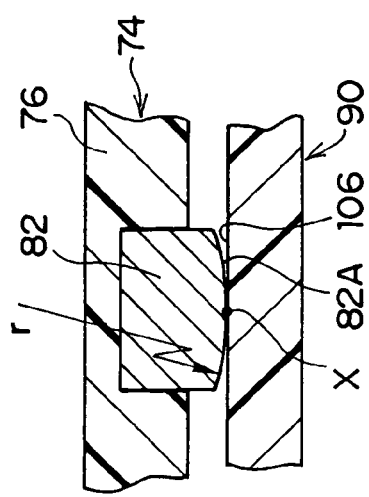
FIG. 10A corresponds to FIG. 9, showing a variant example of the abutting portion of the brake member and release pad which structure the recording tape cartridge relating to the first embodiment of the present invention, and is a sectional view of a first variant example.

In a first variant example shown in FIG. 10A, the rubbing protrusion portion 94 (and the rubbing surface 94A) is not provided at the release pad 90. Rather, a flat upper face of the release pad 90 serves as a rubbing surface 106 which rubs against the rubbing surface 82A. Naturally, all the same effects as in the first embodiment are provided by a structure relating to this first variant example.

Figure 10B:
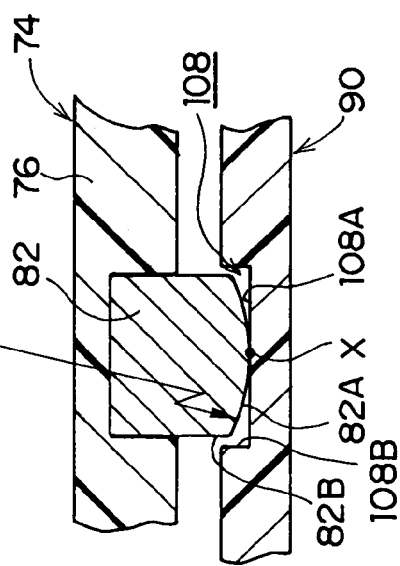
FIG. 10B corresponds to FIG. 9, showing another variant example of the abutting portion, and is a sectional view of a second variant example.

In a second variant example shown in FIG. 10B, a rubbing recess portion 108 is formed at an axial center portion of the release pad 90. A flat bottom surface of this rubbing recess portion 108 serves as a rubbing surface 108A which rubs against the rubbing surface 82A. The rubbing recess portion 108 is formed in a circular shape in plan view, and a distal end portion of the rubbing protrusion portion 82 is entered into the rubbing recess portion 108 such that a recess wall (inner peripheral face) 108B of the rubbing recess portion 108 faces an outer peripheral face 82B of the rubbing protrusion portion 82. With a structure relating to this second variant example, all the same effects as in the first embodiment are provided, in addition to which the rubbing recess portion 108 of the release pad 90 effects a function of restricting mispositioning of the brake member 74 in the diametric direction. Note that this effect could also be provided by providing an annular rib encircling the abovementioned rubbing surface 106 instead of providing the rubbing recess portion 108.

In a third variant example shown in FIG. 10C, a rubbing surface 110, which is a curvedly recessed surface, is formed at the axial center portion of the release pad 90. The rubbing surface 110 has a spherical radius R which is larger than the radius r of the rubbing surface 82A, and is formed as a concave spherical surface whose center is located at a position through which the axial center of the release pad 90 (the rotation center of the reel 14) passes. Thus, in a structure relating to this third variant example too, the rubbing surface 82A is in point contact with the rubbing surface 110 at the peak portion X thereof. Therefore, with a structure relating to this third variant example, all the same effects as in the first embodiment are provided, in addition to which, because the rubbing surface 110 has a form which accommodates the rubbing surface 82A, offsetting of the axial center of the release pad 90 and the peak portion X, which is the portion of the brake member 74 that mutually abuts (rubs) against the release pad 90, is even less likely (i.e., an alignment function is effected).

In a fourth variant example shown in FIG. 10D, instead of the rubbing protrusion portion 82, the brake member 74 is provided with a rubbing protrusion portion 112 with a short circular column form including a rubbing surface 112A, which is a flat surface. That is, the rubbing protrusion portion 112 is a structure whose radius of curvature is set to be infinitely large (r=∞), and the peak portion X is not formed. Thus, the brake member 74 rubs against the rubbing surface 94A of the release pad 90 at the rubbing surface 112A. Hence, rubbing resistance in this case is larger than in a case of point contact, but heat that is generated does not act in a localized manner. Therefore, the resin side rubbing surface 94A will not melt. Further, because the metal side rubbing surface 112A does not have a protruding form, impact (or invasive) effect thereof on the rubbing surface 94A is further reduced, and the corresponding resin side rubbing surface 94A will not be abraded or worn. Thus, with a structure relating to this fourth variant example too, all the same effects as in the first embodiment are provided. Note that an outer edge portion of the rubbing surface 112A has a curved form which is continuous with an outer peripheral face of the rubbing protrusion portion 112. Thus, damage to the rubbing surface 94A by an edge or the like is prevented.

Next, a recording tape cartridge 120 relating to a second embodiment of the present invention will be described. Note that components and portions that are in essence the same as in the first embodiment are assigned the same reference numerals as in the first embodiment, and descriptions thereof are omitted.

Figure 12:
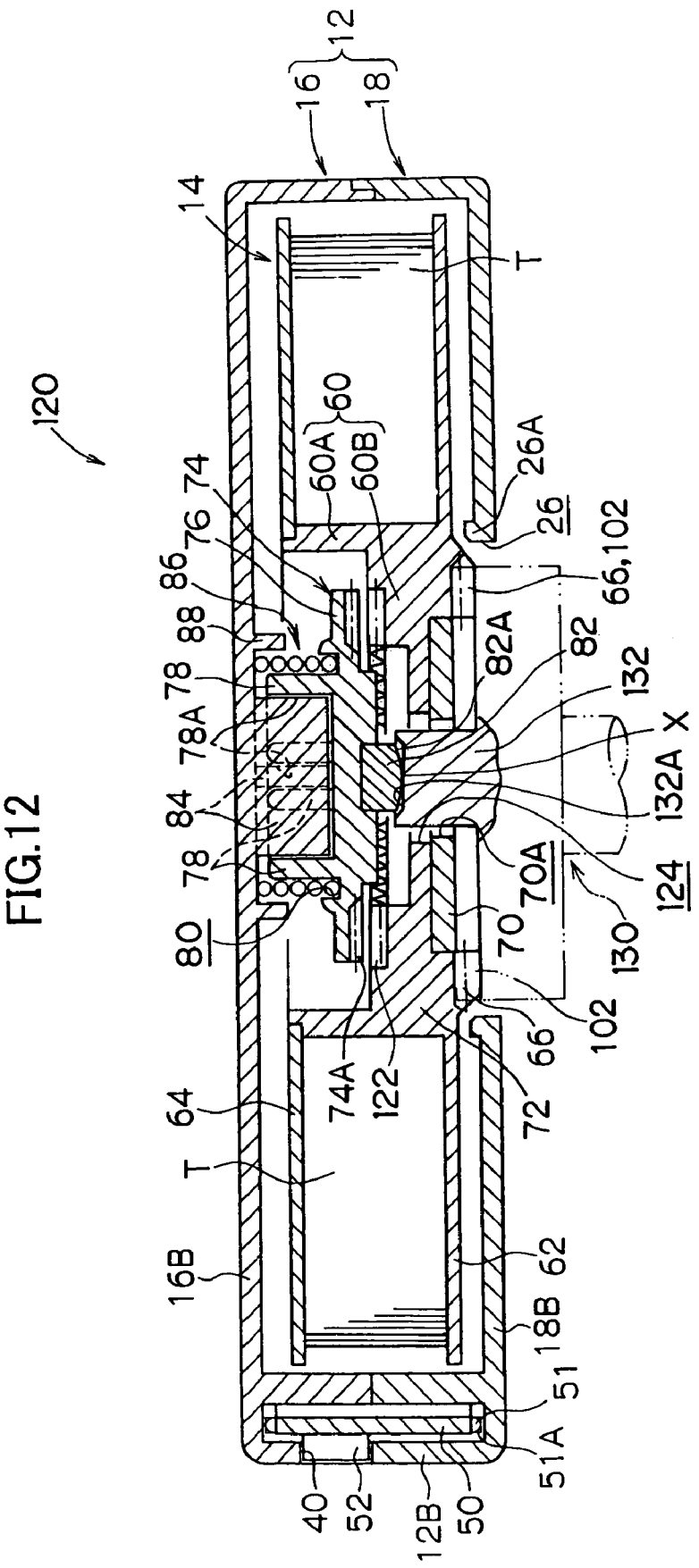
FIG. 12 is a sectional view showing a rotation-enabled state of the reel of the recording tape cartridge relating to the second embodiment of the present invention.
Figure 13:
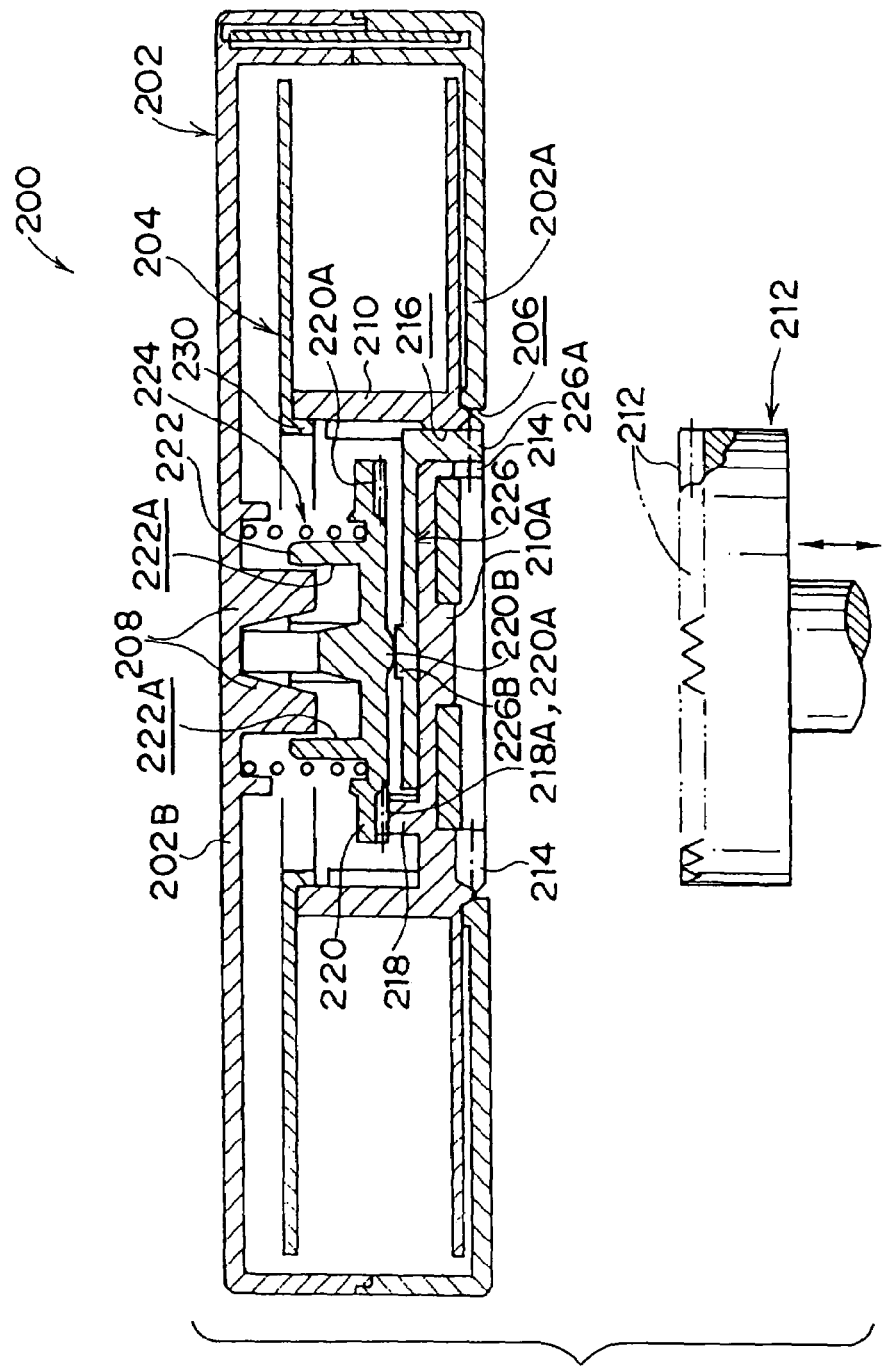
FIG. 13 is a sectional view showing a rotation-locked state of a reel of a conventional recording tape cartridge.
Figure 14:
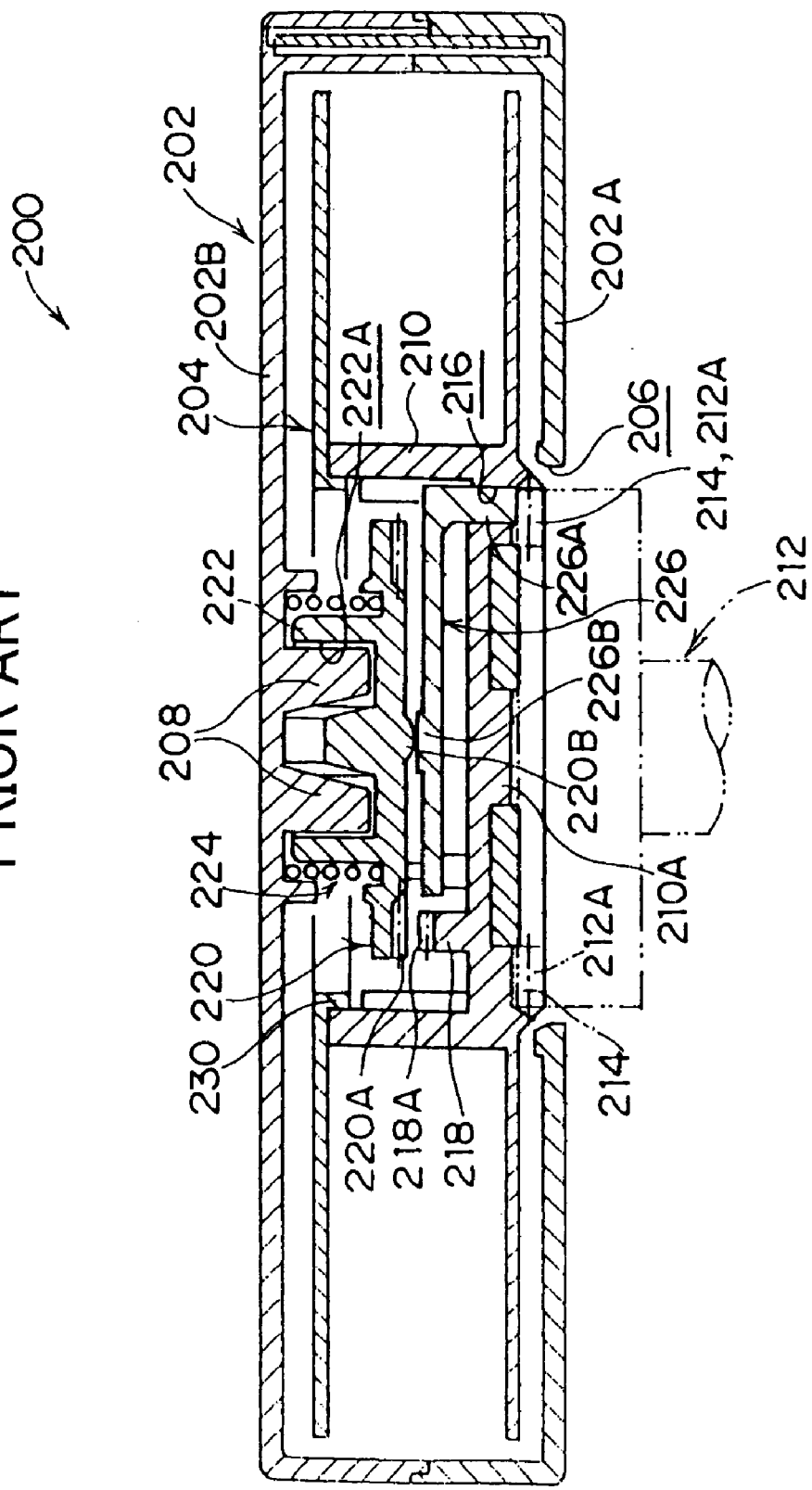
FIG. 14 is a sectional view showing a rotation-enabled state of the reel of the conventional recording tape cartridge.

FIG. 11 shows a sectional view, corresponding to FIG. 7, of the recording tape cartridge 120, and FIG. 12 shows another sectional view, corresponding to FIG. 8, of the recording tape cartridge 120. As shown in these drawings, the recording tape cartridge 120 differs from the recording tape cartridge 10 relating to the first embodiment in that the release pad 90 is not provided. Herebelow, this point is explained in detail.

Instead of the engaging protrusions 72, a reel brake gear 122 is provided in a circular annular form at the upper face of the reel hub 60 of the reel 14, which structures the recording tape cartridge 120. The reel brake gear 122 serves as an engaging portion which is capable of meshing with the brake gear 74A of the brake member 74. Because of this, it is not necessary to provide a space for disposition of the release pad 90 between the base portion 60B and the brake member 74.

A through-hole 124 is formed in the base portion 60B, which penetrates through the axial center portion of the base portion 60B. The through-hole 124 is for insertion of a release-pushing portion 132, which is described below. Thus, the through-hole 124 mutually communicates with a through-hole 70A of the annular reel plate 70 (which through-hole 70A was not discussed for the first embodiment).

Hence, in a state in which the brake member 74 is disposed at the rotation-locking position and the brake gear 74A is meshed with the reel brake gear 122, the rubbing protrusion portion 82 of the brake member 74 is disposed in the through-hole 124 of the reel hub 60, and faces through the through-hole 70A of the reel plate 70 to outside the case 12.

Correspondingly, at an axial center portion of a rotation shaft 130 of a drive device that corresponds with the recording tape cartridge 120, the release-pushing portion 132, which serves as a release portion, is provided protruding upward. An upper end face of the release-pushing portion 132 serves as a flat rubbing surface 132A. A tapering wall 134, with an internal diameter which broadens toward the upper side, is provided around the rubbing surface 132A. This tapering wall 134 functions similarly to the aforementioned recess wall 108B. At this rotation shaft 130, the driving gear 102, the release-pushing portion 132 (and the rubbing surface 132A) and the tapering wall 134 are integrally formed by resin-molding. Thus, the rubbing surface 132A of the release-pushing portion 132 is formed of resin as a flat surface.

When the recording tape cartridge 120 relating to the second embodiment is loaded in a drive device and a bucket thereof descends, the driving gear 102 of the rotation shaft 130 meshes with the reel gear 66 of the reel 14. In accordance with this operation, the release-pushing portion 132 advances into the through-hole 124 (and the through-hole 70A), and the release-pushing portion 132 abuts against the rubbing protrusion portion 82 of the brake member 74 while pushing the same upward. Accordingly, the brake member 74 moves upward against the urging force of the compression coil spring 86 and, as shown in FIG. 12, the brake member 74 moves to the rotation-enabling position and releases the state of meshing of the reel brake gear 122 with the brake gear 74A. Hence, in a state in which the meshing of the reel gear 66 with the driving gear 102 is maintained, the brake member 74 abuts against the release-pushing portion 132 of the rotation shaft 130, and is maintained at the rotation-enabling position.

In this state, when the rotation shaft 130 rotates and drives the reel 14 to rotate, the brake member 74, which is incapable of rotation relative to the case 12, and the release-pushing portion 132 of the rotation shaft 130, which meshes with the reel 14 and drives the same to rotate, relatively rotate. Hence, because of this relative rotation, the mutually abutting rubbing surface 82A and rubbing surface 132A rub together. More specifically, the rubbing surface 82A rubs against the rubbing surface 132A, which is a flat surface, at the peak portion X.

With the recording tape cartridge 120 relating to the second embodiment, in accordance with the finding described earlier, the resin side rubbing contact portion, which rubs against the rubbing surface 82A formed of metal at the brake member 74 during rotation of the reel 14, is formed simply by the rubbing surface 132A of the release-pushing portion 132 at the drive device side (outside the recording tape cartridge 120), instead of by the rubbing surface 94A of the release pad 90. Consequently, the recording tape cartridge 120 too provides all the same effects as the recording tape cartridge 10 relating to the first embodiment.

Thus, with the recording tape cartridge 120, melting, abrasion and the like at the region of abutting of the brake member 74 with the release-pushing portion 132 of the drive device will not occur during rotation of the reel 14.

Note that the present invention is not limited to the embodiments and the first to fourth variant examples described above. Within a range based on the finding mentioned above, various embodiments in which some or all of the characteristic structural elements of these embodiments are suitably combined can be used. Thus, for example, the rubbing surface 110 which is a concave spherical surface could be formed at the upper face of the rubbing protrusion portion 94, the lower face of the rubbing recess portion 108 or the like, and/or the radius r of the rubbing surface 82A could be made to match the radius R of the rubbing surface 110 such that these could be surface-contacted. Further, it is possible to provide the rubbing surface 110 at the upper end of the drive device side release-pushing portion 132. Furthermore, given the aforementioned finding that abrasion and the like of the resin side at a rubbing contact portion between resin and metal is prevented by not giving the resin side a protruding form but giving the metal side a flat surface or a convex spherical surface with a radius of at least 3 mm, obviously, cases in which the rubbing surface 94A, the rubbing surface 108A, the release-pushing portion 132 or the like is fabricated of metal with a convex spherical surface with a radius of at least 3 mm and the rubbing contact portion of the brake gear 74A is fabricated of resin as a flat surface or a concave spherical surface (such as the rubbing surface 110) are included.

Further still, in the embodiments and variant examples described above, the rubbing surface 82A has been structured to be a convex spherical surface as a whole. However, the present invention is not limited thus. For example, in a case in which the rubbing surface 82A rubs against the opposing element at the peak portion X, it is sufficient if the rubbing protrusion portion 82 has a smooth form in the immediate neighborhood of the peak portion X that resembles a convex spherical surface with a radius of at least 3 mm.

Further again, with a recording tape cartridge relating to the present invention, it is sufficient that the brake member 74 or the like, which can attain the rotation-locking position and the rotation-enabling position, is maintained at the rotation-enabling position by the release pad 90, the release-pushing portion 132 or the like during use; the present invention is not limited by shapes and the like of the brake member 74, the release pad 90 and the release-pushing portion 132. Moreover, the present invention is, obviously, not limited by preferable structures of the opening 20, the door 50 and the like.

Further yet, in the embodiments and variant examples described above, structures in which a magnetic tape T is employed as the recording tape are used. However, the present invention is not limited thus. It is sufficient that the recording tape is one of long tape-form information recording/replaying media which can record information and replay information that has been recorded. Of course, the recording tape cartridge relating to the present invention can be applied to recording tape of any kind of recording/replaying system.

As has been explained above, a recording tape cartridge relating to the present invention has excellent effects in that melting, abrasion and the like do not occur at an abutting portion of a brake member with a release member, or with a release portion of a drive device, during rotation of a reel.

What is claimed is:

1. A tape cartridge which is insertable at a tape drive which includes a rotating member and carries out at least one of reading and writing of data, the tape cartridge comprising:
   a reel inside the tape cartridge, the rotating member of the tape drive being engageable with the reel at a time of insertion of the tape cartridge, for transmitting rotary driving force to the reel;
   a brake member having a protruding portion, the brake member being reciprocally movable between a locking position for prohibiting rotation of the reel and an unlocking position for enabling rotation of the reel; and
   a release pad having a protruding portion, the release pad being capable of engaging with the rotating member and abutting against the brake member for moving the brake member to the unlocking position,
   wherein a rubbing surface, which is provided on the protruding portion of the brake member and abuts a rubbing surface provided on the protruding portion of the release pad, is formed of metal and includes a convexly curved surface with a spherical radius of at least 3 mm, and the rubbing surface of the release pad is formed of resin and is formed as a flat surface.

2. The tape cartridge of claim 1, wherein the one abutting portion includes a metallic surface that includes a spherical form with a spherical radius of at least 14 mm, and the other abutting portion includes a resin surface with a curvedly recessed surface form that includes a spherical radius equal to or greater than the radius of the one abutting portion.

3. The tape cartridge of claim 1, further comprising an urging member which continuously urges the brake member toward the locking position.

4. The tape cartridge of claim 1, wherein the release pad is linearly movable in a direction of an axis of rotation of the reel.

5. The tape cartridge of claim 4, wherein the brake member is movable between the locking position and the unlocking position in conjunction with the linear movement of the release pad.

6. The tape cartridge of claim 1, further comprising a case which rotatably accommodates the reel.

7. The tape cartridge of claim 6, wherein the reel comprises a reel gear which is engageable with the rotating member of the tape drive for transmitting the driving force.

8. The tape cartridge of claim 7, wherein an aperture is formed in the case, and the reel gear is exposed through the aperture to outside the case.

9. The tape cartridge of claim 8, wherein the reel gear and the release pad are respectively engageable, through the aperture, with the rotating member of the tape drive.

10. The tape cartridge of claim 1, wherein the rubbing surface of the brake member is mirror finished.

11. The tape cartridge of claim 1, wherein the rubbing surface of the release pad is mirror finished.

12. The tape cartridge of claim 1, wherein the protruding portion of the release pad is formed in a circular column shape.

13. The tape cartridge of claim 1, wherein the protruding portion of the brake member is formed in a circular column shape.

14. The tape cartridge of claim 13, wherein the column shaped protruding portion of the brake member is formed of stainless steel.

15. A tape cartridge which is insertable at a tape drive which includes a rotating member and carries out at least one of reading and writing of data, the tape cartridge comprising:
   a reel inside the tape cartridge, the rotating member of the tape drive being engageable with the reel at a time of insertion of the tape cartridge, for transmitting rotary driving force to the reel;
   a brake member which is reciprocally movable between a locking position for prohibiting rotation of the reel and an unlocking position for enabling rotation of the reel; and
   an abutting portion provided at the brake member, the abutting portion being fabricated of metal, abutting against the rotating member at the time of insertion of the tape cartridge, and including an abutting surface which is capable of abutting against a bottom portion of a recess portion formed at the rotating member for moving the brake member from the locking position to the unlocking position at the time of insertion of the tape cartridge by the abutting surface being pressed by the bottom portion of the recess portion.

16. The tape cartridge of claim 15, wherein the abutting surface comprises a flat surface.

17. The tape cartridge of claim 15, wherein the abutting surface comprises a protruding surface.

18. The tape cartridge of claim 15, wherein the abutting surface comprises a spherical surface with a spherical radius of at least 3 mm.

19. The tape cartridge of claim 15, further comprising an urging member which continuously urges the brake member toward the locking position.

20. The tape cartridge of claim 15, further comprising a case which rotatably accommodates the reel.

21. The tape cartridge of claim 20, wherein the reel comprises a reel gear which is engageable with the rotating member of the tape drive for transmitting the driving force.

22. The tape cartridge of claim 21, wherein an aperture is formed in the case, and the reel gear is exposed through the aperture to outside the case.

23. The tape cartridge of claim 22, wherein the reel gear is engageable, through the aperture, with the rotating member of the tape drive.

24. The tape cartridge of claim 15, wherein a through-hole is formed in the reel, and the abutting portion of the brake member is exposed through the through-hole to outside the case.

25. The tape cartridge of claim 24, wherein the abutting portion of the brake member is engageable, through the through-hole, with the rotating member of the tape drive.

* * * * *